United States Patent [19]

Yamashita et al.

[11] Patent Number: 5,728,318

[45] Date of Patent: Mar. 17, 1998

[54] LIQUID CRYSTAL COMPOSITION, LIQUID CRYSTAL DEVICE AND LIQUID CRYSTAL DISPLAY APPARATUS

[75] Inventors: Masataka Yamashita, Chigasaki; Kazuharu Katagiri, Tama; Masahiro Terada, Hadano; Shosei Mori, Hiratsuka; Syuji Yamada, Atsugi; Hiroshi Mizuno, Zama, all of Japan

[73] Assignee: Canon Kabushiki Kaisha, Tokyo, Japan

[21] Appl. No.: 555,063

[22] Filed: Nov. 8, 1995

[51] Int. Cl.$^6$ .......... C09K 19/34; C09K 19/32; C09K 19/12; G02F 1/133

[52] U.S. Cl. .......... 252/299.62; 252/299.61; 252/299.63; 252/299.65; 252/299.66

[58] Field of Search .......... 252/299.61, 299.62, 252/299.01, 299.6, 299.63, 299.66, 299.65

[56] References Cited

U.S. PATENT DOCUMENTS

| | | | |
|---|---|---|---|
| 4,367,924 | 1/1983 | Clark et al. | 359/56 X |
| 5,091,109 | 2/1992 | Takiguchi et al. | 252/299.61 |
| 5,354,501 | 10/1994 | Nakamura et al. | 252/299.62 |
| 5,385,692 | 1/1995 | Iwaki et al. | 252/299.62 |
| 5,405,553 | 4/1995 | Terada et al. | 252/299.61 |
| 5,413,735 | 5/1995 | Yamashita et al. | 252/299.61 |
| 5,458,804 | 10/1995 | Yamada et al. | 252/299.01 |
| 5,460,749 | 10/1995 | Terada et al. | 252/299.61 |
| 5,462,694 | 10/1995 | Kosaka et al. | 252/299.61 |
| 5,589,103 | 12/1996 | Yamada et al. | 252/299.61 |

FOREIGN PATENT DOCUMENTS

| | | |
|---|---|---|
| 546338 | 6/1993 | European Pat. Off. . |
| 571955 | 12/1993 | European Pat. Off. . |
| 606090 | 7/1994 | European Pat. Off. . |
| 640677 | 3/1995 | European Pat. Off. . |
| 59-193426 | 11/1984 | Japan . |
| 59-193427 | 11/1984 | Japan . |
| 60-031120 | 2/1985 | Japan . |
| 60-156046 | 8/1985 | Japan . |
| 60-156047 | 8/1985 | Japan . |
| 1140198 | 6/1989 | Japan . |
| 3035220 | 2/1991 | Japan . |
| 3252624 | 11/1991 | Japan . |
| 5262678 | 10/1993 | Japan . |
| 6256231 | 9/1994 | Japan . |

OTHER PUBLICATIONS

F. Nakano et al., Japanese Journal of Applied Physics, v. 19 No. 10, pp. 2013–14, Oct. 1980.

K. Miyasato et al., Japanese Journal of Applied Physics, v. 22 No. 10, Oct. 1983, pp. L661–L663.

N. Clark et al., Proc. of the 6th Int'l. Display Research Conf., "Japan Display, 1986", Tokyo, pp. 456–458.

Y. Ouchi et al., Japanese Journal of Applied Physics, v. 27 No. 5, May 1988, pp. L725–L728.

*Primary Examiner*—C. H. Kelly
*Attorney, Agent, or Firm*—Fitzpatrick, Cella, Harper & Scinto

[57] ABSTRACT

A liquid crystal composition is composed of at least three types of mesomorphic compounds. The liquid crystal composition may preferably contain a mesomorphic compound having an indan skeleton represented by the formula (1) or (3) and a mesomorphic compound having a terminal cyclic group represented by the formula (2) or (4). The liquid crystal composition may also preferably further contain an optically active compound to be formulated as a chiral smectic (or ferroelectric) liquid crystal composition. When the chiral smectic liquid crystal composition is disposed between a pair of electrode substrates provided with uniaxial alignment axes, the liquid crystal composition may preferably be placed in an alignment state in C1 uniform alignment, so that a resultant liquid crystal device provides a higher contrast ratio and a wider drive voltage margin.

22 Claims, 9 Drawing Sheets

C1 ALIGNMENT  $\text{H} + \delta > \alpha$

C2 ALIGNMENT  $\text{H} - \delta > \alpha$

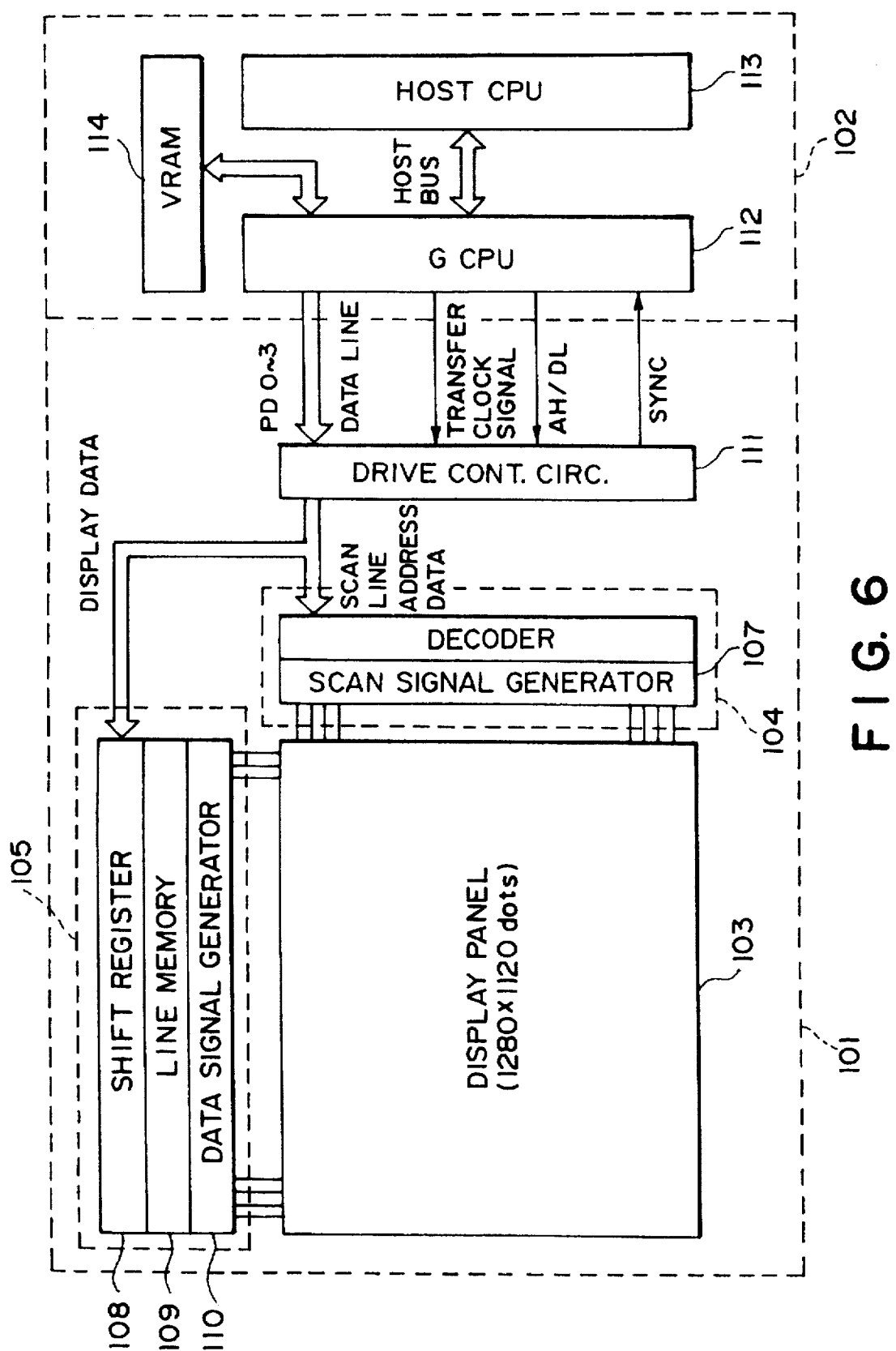
F I G. 6

LIQUID CRYSTAL COMPOSITION, LIQUID CRYSTAL DEVICE AND LIQUID CRYSTAL DISPLAY APPARATUS

FIELD OF THE INVENTION AND RELATED ART

The present invention relates to a liquid crystal composition, a liquid crystal device using the composition to be used in a liquid crystal display device or a liquid crystal-optical shutter, etc., and a liquid crystal apparatus using the device. Particularly, the present invention relates to a liquid crystal composition containing two-types of specific mesomorphic compounds in combination, a liquid crystal device using the composition in which the composition is placed in a particular alignment state, and a liquid crystal display apparatus using the device.

A display device of the type which controls transmission of light in combination with a polarizing device by utilizing the refractive index anisotropy of ferroelectric (or chiral smectic) liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure and, in the SmC* or SmH, phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display based on its excellent function.

Heretofore, there have been pointed out various problems as to such a ferroelectric liquid crystal (composition), a ferroelectric liquid crystal device and a ferroelectric liquid crystal apparatus, and there have been also proposed various means for solving the problems.

For example, Japanese Laid-Open Patent Application (JP-A) 3-252624 has disclosed a method for improving a transmittance (contrast) in a bistable alignment state by utilizing C1 uniform alignment state based on specific device structure and specific alignment state of liquid crystal molecules used in combination. More specifically, in a liquid crystal device, by placing ferroelectric liquid crystal molecules in non-helical structure in such an alignment state that the liquid crystal device and ferroelectric liquid crystal molecules are controlled to provide various angles including an apparent tilt angle θa (a half of an angle formed between molecular axes in two stable states), a cone (or tilt) angle $\widehat{H}$ (a half of an apex angle of a cone shown in FIG. 3A as described hereinbelow) which is an inherent property of the ferroelectric liquid crystal, a pretilt angle α (an angle formed between the liquid crystal molecules raising a forward end up and the substrate surface of the liquid crystal device, and an inclination angle (layer inclination angle) δ of the smectic layer (an angle formed between the smectic layer line and a normal to the substrate) satisfying particular relationships (I), (II) and (III) (described hereinbelow) for providing C1 uniform alignment state (C1 uniform conditions), thus improving a contrast ratio (or transmittance).

Generally, there has been known a technique increasing a cone angle $\widehat{H}$ as means for improving contrast. However, an excessively increased cone angle $\widehat{H}$ fails to satisfy the above C1 uniform conditions, thus leading to an occurrence of C2 alignment state different from the C1 alignment state.

As a result, a resultant liquid crystal adversely causes a lowering in contrast. Further, due to a correlation between a temperature-dependence of cone angle $\widehat{H}$ and a responsiveness, a temperature-dependence of response speed is impaired in some cases.

If a cone angle $\widehat{H}$ is increased, a large torque is required for effecting switching of liquid crystal molecules. In order to supplement the torque, when a spontaneous polarization (Ps) of the liquid crystal is increased, a viscosity of the liquid crystal is caused to be increased to result in an inferior temperature-dependence of response speed depending on a temperature-dependence of viscosity in some cases. Further, there has been known that an internal electric field induced by a spontaneous polarization has adversely invited switching failure.

On the other hand, there has been known the use of a mesomorphic compound having a low temperature-dependence of viscosity in a large amount in order to enhance a temperature-dependence of response speed while satisfying the above-mentioned C1 uniform conditions (i.e., device conditions for realizing C1 uniform alignment). As described above, a spontaneous polarization is refrained from being increased excessively in view of inferior responsiveness, so that it is important that an improving technique paying attention to viscosity is provided.

By preparing a liquid crystal composition containing a large amount of a low-viscosity mesomorphic compound, a temperature change of viscosity in a temperature range from low-temperature to high-temperature can be minimized to improve a temperature-dependence of response speed. However, such a composition generally has a small cone angle $\widehat{H}$ to invite a lowering in contrast.

In case where improvements in various characteristics are intended while retaining or improving C1 uniform aligning characteristic, a liquid crystal composition used is required to contain a novel mesomorphic compound and/or known mesomorphic compounds in combination since a ferroelectric liquid crystal composition is not composed of a single mesomorphic compound but composed of plural mesomorphic compounds. It is however readily understood that these mesomorphic compounds have merits and demerits in combination, respectively.

For this reason, in the case of preparing a ferroelectric liquid crystal composition, it is important that a combination of mesomorphic compounds, such that the mesomorphic compounds supplement their demerits with each other while deriving their merits sufficiently, is selected. As a result, a specific combination of mesomorphic compounds for providing a balanced ferroelectric liquid crystal composition with respect to various characteristics has been studied and required.

On the other hand, a display apparatus using a ferroelectric (or chiral smectic) liquid crystal can realize a large screen and a high resolution which by far exceed those attained by conventional CRT and TN-type liquid crystal displays. However, as the screen size and resolution are increased, the frame frequency (frequency constituting one picture) becomes low. This leads to a problem that the picture-rewriting speed becomes slow and the motion picture display becomes slow, e.g., in cases of smooth scrolling and cursor movement on character editing or a graphic screen. A solution to this problem has been given in, e.g., JP-A 60-31120 and JP-A 1-140198.

More specifically, there has been disclosed a display apparatus including a display panel comprising scanning electrodes and data electrodes arranged in a matrix, whole-area writing means for selecting all or a prescribed part of the scanning electrodes for writing and partial writing means for selecting a part of the above-mentioned all or a prescribed part of the scanning electrodes. As a result, a partial motion picture display can be performed at a high speed by the partial writing mode, and the partial writing and the whole-area writing can be performed compatibly.

Further, in order to realize a ferroelectric liquid crystal display device with a large display area and high definition, a good drive characteristic, such as a wider drive voltage margin, has been required (JP-A 3-35220). The drive voltage margin varies depending on a change in environmental temperature, so that an actual display device (or apparatus) is required to be controlled to have an optimum drive voltage margin against liquid crystal materials used and a charge in environmental temperature.

In a practical use, however, when the display area of such a matrix display apparatus is increased, a difference in environmental condition of a liquid crystal at each pixel (e.g., an environmental temperature or cell gap between opposite electrodes) is naturally increased. As a result, it becomes impossible to provide a good display image over the entire display area in the case of using a liquid crystal material having a small drive voltage margin.

SUMMARY OF THE INVENTION

An object of the present invention is to provide a liquid crystal composition showing a balanced performance regarding C1 uniform aligning characteristic, contrast, drive voltage margin and temperature-dependence of response speed.

Another object of the present invention is to provide a liquid crystal device using the liquid crystal composition and a liquid crystal apparatus using the liquid crystal device.

The liquid crystal composition according to the present invention contains the following two essential components including a mesomorphic compound represented by the following formula (1):

$$R_1-A_1-X_1-A_2-X_2-A_3-R_2 \quad (1)$$

wherein $R_1$ and $R_2$ independently denote hydrogen, halogen,

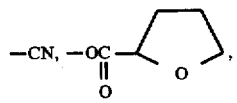

or a linear branched or cyclized alkyl group having 1–18 carbon atoms capable of including at least one methylene group which can be replaced with —O—; —S—; —CO—; —CHW—, where W is halogen or $CF_3$; —CH=CH— or —C≡C— with the proviso that heteroatoms are not adjacent to each other;

$X_1$ and $X_2$ independently denote a single bond,

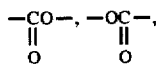

—CH$_2$O—, —OCH$_2$—, —CH=CH— or —C≡C—;

$A_1$, $A_2$ and $A_3$ independently denote a single

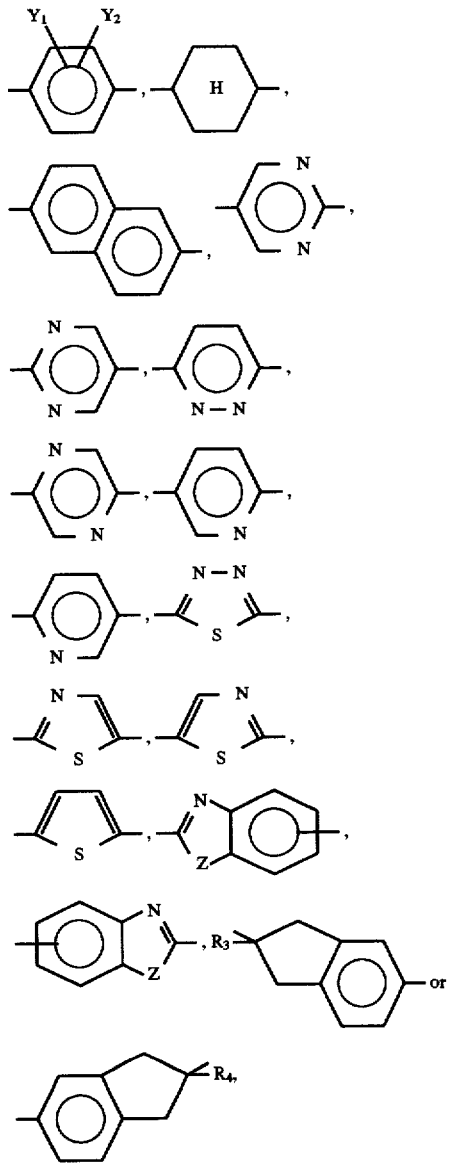

wherein $R_3$ and $R_4$ independently denote hydrogen, halogen,

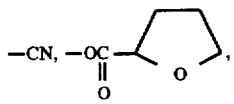

or a linear or branched alkyl group having 1–18 carbon atoms capable of including at least one methylene group which can be replaced with —O—; —S—; —CO—; —CHW— where W is halogen or $CF_3$; —CH=CH— or —C≡C— with the proviso that heteroatoms are not adjacent to each other; $Y_1$ and $Y_2$ independently denote, H, F, Cl, Br, —CH$_3$, —CF$_3$ or —CN; Z denotes O or S; and or S; and at least one of $A_1$, $A_2$ and $A_3$ is

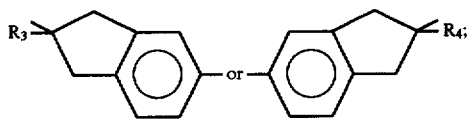

and a mesomorphic compound represented by the following formula (2):

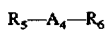  (2), wherein $R_5$ and $R_6$ independently denote

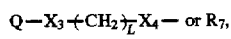

at least one of $R_5$ and $R_6$ being

wherein Q denotes

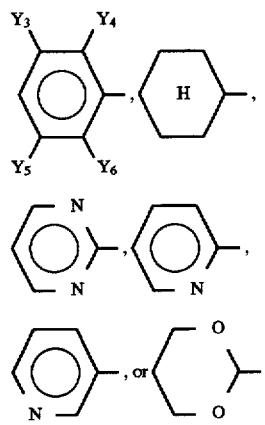

where $Y_3$, $Y_4$, $Y_5$, $Y_6$ independently denote H, F, $CH_3$ or $CF_3$; $X_3$ denotes a single bond, —$OCH_2$—, —COO— or —OCO—; $X_4$ denotes a single bond, —$CH_2O$—, —COO— or —OCO—; L is an integer of 3–16; and $R_7$ is

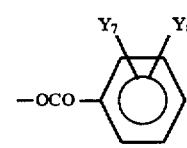

wherein $Y_7$ and $Y_8$ independently denote H, F, $CH_3$ or $CF_3$, or a linear, branched, or cyclized alkyl group having 1–18 carbon atoms capable of including at least one methylene group which can be replaced with —O—, —S—, —CO—, —CH=CH—, —C≡C—, or —CHW— where W is halogen, CN or $CF_3$, provided that heteroatoms are not adjacent to each other; and $A_4$ denotes —$A_5$—$X_5$—$A_6$— or —$A_5$—$A_6$—$X_5$—$A_7$— wherein $A_5$, $A_6$, $A_7$ independently denote

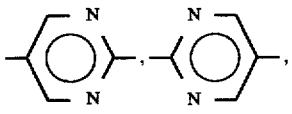

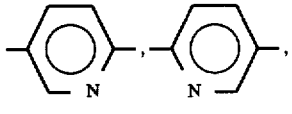

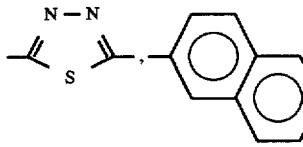

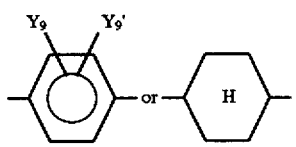

wherein $Y_9$ and $Y_9$' independently denote H, F, $CH_3$ or $CF_3$, at least one of $A_5$, $A_6$ and $A_7$ being any one of

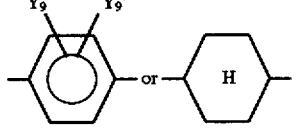

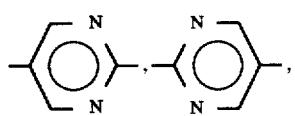

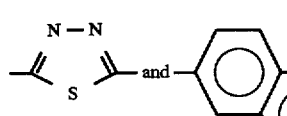

and $X_5$ denotes a single bond, —C≡C—, —CH=CH—, —COO—, —COS— or —$CH_2O$—.

In the above formula (1), either one of the remaining two groups of $A_1$, $A_2$ and $A_3$ other than the group having an indan skeleton may preferably be any one of the above cyclic groups. In other words, the remaining two groups cannot be a single bond at the same time.

According to the present invention, there is also provided a liquid crystal device, comprising: a pair of oppositely disposed substrate and a liquid crystal disposed therebetween, each of opposite surfaces of the substrates being provided with an electrode for applying a voltage to the liquid crystal; wherein at least one of the opposite surfaces of the substrates is further provided with an alignment control layer for controlling an alignment state of the liquid crystal, and the liquid crystal is the above-mentioned liquid crystal composition.

According to the present invention, there is further provided a liquid crystal apparatus, including: the above-mentioned liquid crystal device and drive means for driving the liquid crystal device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6 is a block diagram of a liquid crystal display apparatus and a graphic controller.

DESCRIPTION OF THE PREFERRED EMBODIMENTS

Figure 1:
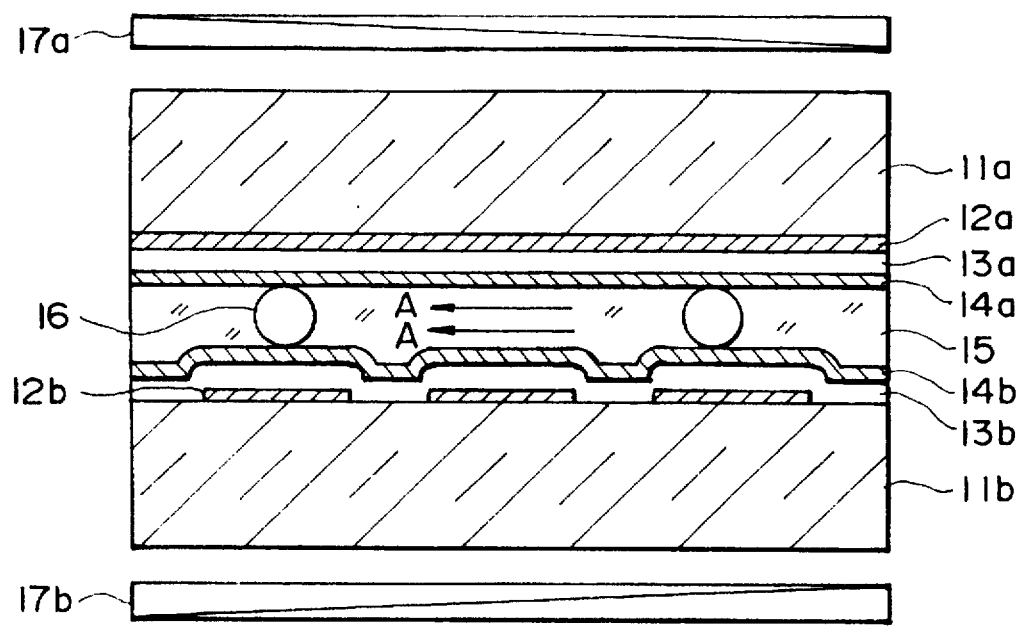
FIG. 1 is a schematic sectional view of an embodiment of the liquid crystal device according to the present invention.

The liquid crystal composition according to the present invention contains at least two essential components including the above-mentioned mesomorphic compounds of the formula (1) and the formula (2).

Herein, the term "mesomorphic compound" covers not only a compound showing a mesomorphic (or liquid crystal) phase by itself but also a compound not showing a mesomorphic phase as long as a resultant liquid crystal composition containing the compound shows a mesomorphic phase.

The liquid crystal composition of the present invention may preferably contain at least one optically active compound to assume chiral smectic phase, thus functioning as a ferroelectric liquid crystal composition.

Herein, the term "cyclized alkyl group" means a cyclic alkyl group or an alkyl group having a partially cyclized structure in which the cyclized structure may be constituted by hydrocarbon (e.g., methylene) group and/or at least one heteroatom (e.g., O, S, N, etc.).

The liquid crystal composition characterized by a specific combination of mesomorphic compounds of the formulae (1) and (2) is effective in improving various display (and drive) characteristics balanced with each other. The reason has not been clarified as yet but this may attributable to the interaction between an indan skeleton of the mesomorphic compound of the formula (1) and a cyclic group connected with methylene groups of the mesomorphic compound of the formula (2), thus compensating for the respective demerits each other while sufficiently deriving the respective merits therefrom.

More specifically, by an effect of lowering a degree of order in smectic phase of liquid crystal molecules, a lowering in response speed due to an extreme increase in viscosity at low-temperature can be prevented since a high degree of order in smectic phase of liquid crystal molecules may cause an increase in viscosity of a resultant liquid crystal composition as a whole. As a result, the liquid crystal composition of the present invention exhibits an effect of decreasing a temperature-dependence of response speed. In addition, the mesomorphic compounds of the formulae (1) and (2) have the advantage of readily controlling material properties of the liquid crystal composition (e.g., cone angle Ⓗ and layer inclination angle δ) so as to satisfy the C1 uniform conditions as specifically described hereinbelow, thereby realizing high contrast while retaining or improving a uniform aligning characteristic.

The mesomorphic compound of the formula (1) used in the present invention may preferably be a mesomorphic compound represented by the following formula (3):

$$R_8\text{—}A_8\text{—}A_9\text{—}A_{10}\text{—}R_9 \quad (3),$$

wherein $R_8$ and $R_9$ independently denote a linear, branched or cyclized alkyl group having 1–18 carbon atoms capable of including at least one methylene group which can be replaced by —O—, —S—, —CO—, —CH=CH—, —C≡C—, or —CHW— where W is halogen or $CF_3$ provided that heteroatoms are not adjacent to each other; and $A_8$, $A_9$ and $A_{10}$ independently denote a single bond

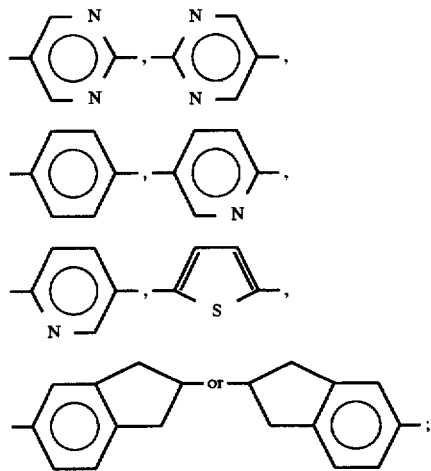

and at least one of $A_8$, $A_9$ and $A_{10}$ is

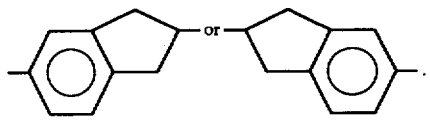

The mesomorphic compound represented by the formula (1) or the formula (3) may generally be synthesized through a process as shown in, e.g., JP-A 5-262678 (corr. to EP-A-0546338).

Specific examples of the mesomorphic compound of the formulae (1) and (3) may include those shown in JP-A 5-262678 (or EP-A-0546338).

Hereinbelow, preferred specific examples of the mesomorphic compounds of the formulae (1) and (3) may include those shown below, respectively.

In the following, the respective abbreviations (or symbols) represent the following groups (or meanings), respectively.

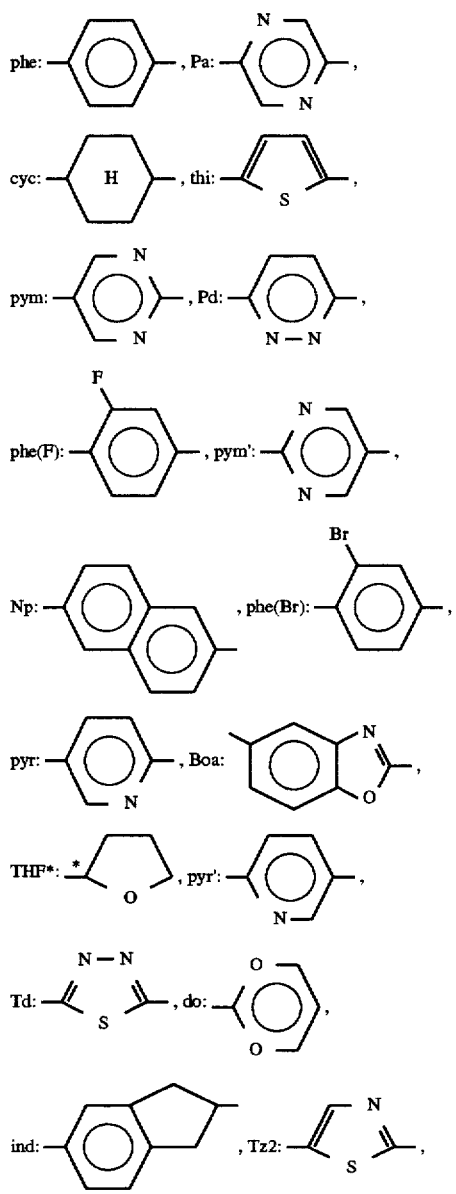

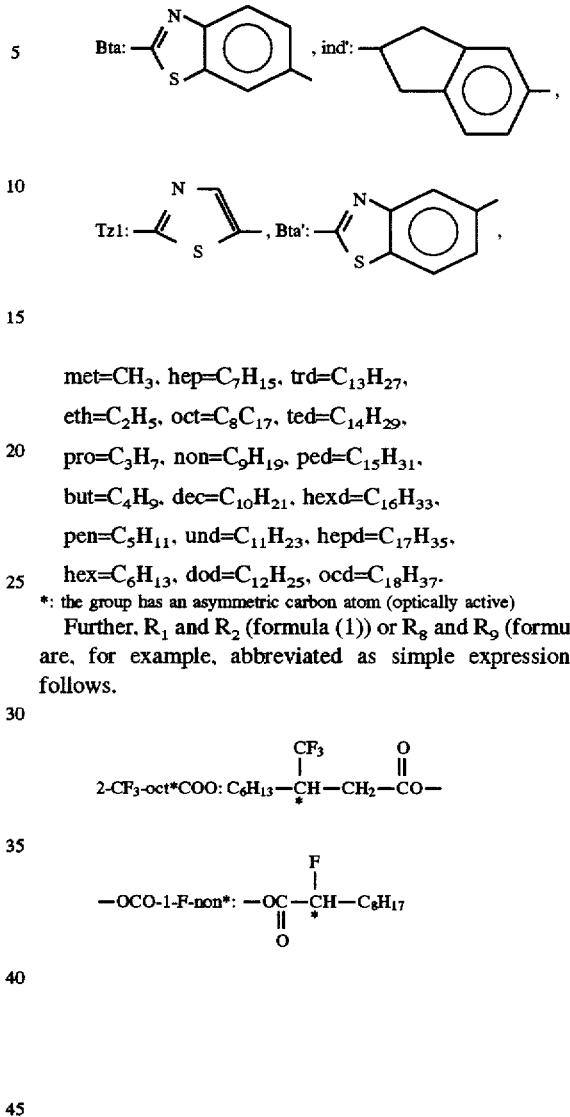

met=CH₃, hep=C₇H₁₅, trd=C₁₃H₂₇,
eth=C₂H₅, oct=C₈C₁₇, ted=C₁₄H₂₉,
pro=C₃H₇, non=C₉H₁₉, ped=C₁₅H₃₁,
but=C₄H₉, dec=C₁₀H₂₁, hexd=C₁₆H₃₃,
pen=C₅H₁₁, und=C₁₁H₂₃, hepd=C₁₇H₃₅,
hex=C₆H₁₃, dod=C₁₂H₂₅, ocd=C₁₈H₃₇.

*: the group has an asymmetric carbon atom (optically active)

Further, $R_1$ and $R_2$ (formula (1)) or $R_8$ and $R_9$ (formula 3) are, for example, abbreviated as simple expressions as follows.

$$2\text{-}CF_3\text{-}oct{*}COO: C_6H_{13}-\underset{*}{\overset{CF_3}{C}H}-CH_2-\overset{O}{\underset{\|}{C}}O-$$

$$-OCO\text{-}1\text{-}F\text{-}non{*}: -O\underset{\|}{\overset{}{C}}-\underset{*}{\overset{F}{C}H}-C_8H_{17}$$

| Ex.Comp. No. | R₁ | A₁ | X₁ | A₂ | X₂ | A₃ | R₂ |
|---|---|---|---|---|---|---|---|
| 1-1 | dod | ind' | —OCH₂— | cyc | — | — | oct |
| 1-2 | hex | — | —COO— | ind' | —OCO— | cyc | pro |
| 1-3 | C₂H₅C*H(CH₃)CH₂O— | ind' | —OCO— | cyc | — | — | oct |
| 1-4 | oct | ind' | —OCO— | Bta | —O— | — | but |
| 1-5 | hex | ind' | —OCO— | Bta | —O— | — | oct |
| 1-6 | but | — | —O— | ind' | —OCO— | -Bta'- | —O-dec |
| 1-7 | hex | ind' | — | Td | — | phe | —O-hex |
| 1-8 | but | ind' | — | Td | — | phe | —OCH₂C*FHC₆H₁₃ |
| 1-9 | C₂H₅CH(CH₃)CH₂ | ind' | — | Td | — | phe(F) | —OCH₂CH₂OC₂H₅ |
| 1-10 | dod | ind' | — | Td | — | phe | oct |
| 1-11 | oct | ind' | — | Tz1 | — | phe | non |
| 1-12 | dod | ind' | — | Tz2 | — | phe | —O-oct |
| 1-13 | hex | ind' | — | Tz2 | — | phe | —OCH₂C*(F)HC₄F₉ |
| 1-14 | dec | ind' | — | Bta | — | phe | —Opeh |
| 1-15 | dod | ind' | —COO— | phe | — | Tz1 | oct |

-continued

Formula (1) compound

| Ex.Comp. No. | $R_1$ | $A_1$ | $X_1$ | $A_2$ | $X_2$ | $A_3$ | $R_2$ |
|---|---|---|---|---|---|---|---|
| 1-16 | dec-O— | ind' | —OCO— | phe | —OCO— | — | THF* |
| 1-17 | dod | ind' | — | Boa | — | phe | oct |
| 1-18 | hex | ind' | — | Boa | — | phe | but |
| 1-19 | dod | ind' | — | Tz2 | — | Np | —OCObut |
| 1-20 | oct | ind' | —C≡C— | Pa | — | — | dec |
| 1-21 | oct | ind' | — | phe | —C≡C— | pyr' | dec |
| 1-22 | non | ind' | —OCH$_2$— | pd | — | ird | oct |
| 1-23 | met | ind' | — | Np | — | ind | hex |
| 1-24 | dec | ind' | — | Boa | — | ind | oct |
| 1-25 | hex | ind' | — | Bta | — | ind | oct |
| 1-26 | pen ($R_3$ = mek) | ind' | — | phe | — | ind | hex ($R_4$ = oct) |
| 1-27 | non ($R_3$ = dec) | ind' | — | pym | — | ind | non |
| 1-28 | trd ($R_3$ = dec) | ind' | — | pd | — | ind | but ($R_4$ = pro) |
| 1-29 | but ($R_3$ = pro) | ind' | — | Tz1 | — | ind | non ($R_4$ = non) |
| 1-30 | hex | ind' | — | pa | — | — | hex |

In the above, $R_3$ and $R_4$ are hydrogen unless expressly indicated otherwise.

the present invention may preferably be a mesomorphic compound represented by the following formula (4):

Formula (3) compound

| Ex. Comp. No. | $R_8$ | $A_8$ | $A_9$ | $A_{10}$ | $R_9$ |
|---|---|---|---|---|---|
| 3-1 | met | pym | ind | — | met |
| 3-2 | pen | pym | ind | — | but |
| 3-3 | hex | pym | ind | — | hep |
| 3-4 | dec | pym | ind | — | oct |
| 3-5 | dod | pym | ind | — | oct |
| 3-6 | ocd | pym | ind | — | oct |
| 3-7 | oct-O— | pym | ind | — | oct |
| 3-8 | 2-F-dec*-O— | pym | ind | — | oct |
| 3-9 | 2-CF$_3$-oct*COO— | pym | ind | — | oct |
| 3-10 | THF*—COO— | pym | ind | — | oct |
| 3-11 | pro-COO—(CH$_2$)—$_2$ | pym | ind | — | oct |
| 3-12 | dec | pym | ind | — | 3-met-but |
| 3-13 | dec | pym | ind | — | —O-oct |
| 3-14 | dec | pym | ind | — | —OCO-hex |
| 3-15 | dec | pym | ind | — | —(CH$_2$)—$_2$COO-pro |
| 3-16 | dec | pym | ind | — | —OCO-1-F-non* |
| 3-17 | dec | pym | ind | — | O—(CH$_2$)—$_2$C≡C-eth |
| 3-18 | dec | pym | ind | — | —O—(CH$_2$)—$_2$S-met |
| 3-19 | CH$_2$=CH—CH$_2$—$_9$O | phe | phe | ind | oct |
| 3-20 | hex | pym | phe | ind | hex |
| 3-21 | oct | pym | phe | ind | hex |
| 3-22 | dod | pym | phe | ind | hex |
| 3-23 | hex | pym | phe | ind | oct |
| 3-24 | oct | pym | phe | ind | oct |
| 3-25 | und | pym | phe | ind | oct |
| 3-26 | dod | pym | phe | ind | oct |
| 3-27 | oct | ind | thi | ind | oct |
| 3-28 | dec | ind | thi | ind | oct |
| 3-29 | hex | pyr | ind | — | hex |
| 3-30 | dec | pyr | ind | — | hex |
| 3-31 | dod | pyr | ind | — | oct |
| 3-32 | pen | phe | phe | ind | hex |
| 3-33 | oct | phe | phe | ind | hex |
| 3-34 | dec | phe | phe | ind | oct |
| 3-35 | dod | phe | phe | ind | oct |

The mesomorphic compound of the formula (2) used in

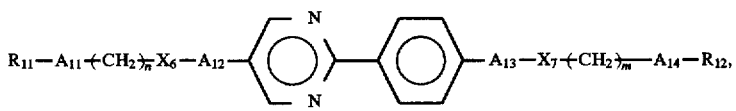

wherein $R_{11}$ and $R_{12}$ independently denote hydrogen, or a linear, branched or cyclized alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other, with the proviso that either one of $R_{11}$ and $R_{12}$ is hydrogen;

$A_{11}, A_{12}, A_{13}$ and $A_{14}$ independently denote a single bond,

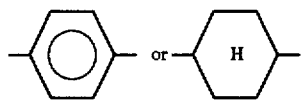

with the provisos that either one of $A_{11}$ and $A_{14}$ is a single bond, both of $A_{11}$ and $A_{14}$ cannot be a single bond simultaneously, and at least one of $A_{12}$ and $A_{13}$ is a single bond;

n and m independently denote an integer of 0 or 3–16 with the provisos that either one of n and m is 0, and both of n and m cannot be 0 at the same time; and $X_6$ and $X_7$ independently denote a single bond, —O—, —COO— or —OCO—.

The mesomorphic compound represented by the formula (2) or the formula (4) may generally be synthesized through a process as shown in, e.g., JP-A 6-256231 (corr. to EP-A-0606090).

Specific examples of the mesomorphic compound of the formulae (2) and (4) may include those shown in JP-A 6-256231 (or EP-A-0606090).

Hereinbelow, preferred specific examples of the mesomorphic compounds of the formulae (2) and (4) may include those shown below, respectively.

In the following, the respective abbreviations (or symbols) represent the same groups (or meanings), respectively, as described above.

For simplicity, $R_5$ and $R_6$ (formula (2)) or $R_{11}$ and $R_{12}$ (formula (4)) are, e.g., shown as follows.

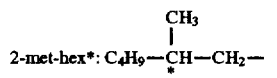

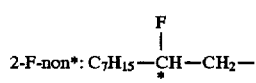

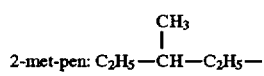

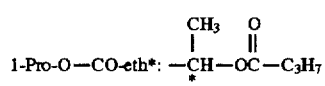

| | Formula (2) compound | | |
|---|---|---|---|
| Ex. Comp. No. | $R_5$ | $A_4$ | $R_6$ |
| 2-1 | hex-o- | —Np—COO-phe- | -(CH₂)₇-phe-H |
| 2-2 | oct | -phe-Td-phe- | -(CH₂)₇-phe-H |
| 2-3 | hex | -phe-Td-phe- | -(CH₂)₃-phe-H ($Y_3$=F) |
| 2-4 | dod | -phe-Td-phe- | -(CH₂)₄-Cy-H |
| 2-5 | pro | -Cy-Coo-Np- | —O-(CH₂)₁₀-phe-H |
| 2-6 | hex | -Cy-C≡C—Np- | -(CH₂)₆-phe-H |
| 2-7 | hex-O— | -pyr-COO-phe- | -(CH₂)₅-Cy-H |
| 2-8 | met-O— | -Np-CH=CH-phe- | —O-(CH₂)₆-phe-H ($Y_3$=F) |
| 2-9 | H-phe(CH₂)₈ | -Td-phe- | —OCO-Cy-H ($Y_3$=CF₃) |
| 2-10 | oct | -pyr'-OCO-phe- | -(CH₂)₃-do |

In the above, $Y_1$ to $Y_4$ are hydrogen unless expressly indicated otherwise.

Formula (4) compound

| Ex. Comp. No | $R_{11}$ | $A_{11}$ | n | $X_6$ | $A_{12}$ | $A_{13}$ | $X_7$ | m | $A_{14}$ | $R_{12}$ |
|---|---|---|---|---|---|---|---|---|---|---|
| 4-1 | hexd | — | 0 | — | — | — | — | 3 | phe | H |
| 4-2 | oct | — | 0 | — | — | — | — | 3 | phe | H |
| 4-3 | non | — | 0 | — | — | — | — | 3 | phe | H |
| 4-4 | dec | — | 0 | — | — | — | — | 3 | phe | H |
| 4-5 | pen | — | 0 | — | phe | — | — | 3 | phe | H |
| 4-6 | dec | — | 0 | — | — | — | — | 4 | phe | H |
| 4-7 | oct | — | 0 | — | — | — | — | 4 | phe | H |
| 4-8 | dod | — | 0 | — | — | — | — | 4 | phe | H |
| 4-9 | dec | — | 0 | — | — | — | —O— | 4 | phe | H |
| 4-10 | dec | — | 0 | —O— | — | — | — | 4 | phe | H |
| 4-11 | ted | — | 0 | — | — | — | —OCO— | 4 | phe | H |
| 4-12 | non | — | 0 | — | — | — | — | 4 | phe | H |
| 4-13 | oct | — | 0 | — | phe | — | — | 4 | phe | H |
| 4-14 | hex | — | 0 | — | phe | — | — | 4 | phe | H |
| 4-15 | hep | — | 0 | — | phe | — | —O— | 4 | phe | H |
| 4-16 | dec | — | 0 | — | — | phe | — | 4 | phe | H |
| 4-17 | ped | — | 0 | — | — | — | —O— | 5 | phe | H |
| 4-18 | dec | — | 0 | — | — | — | —O— | 5 | phe | H |
| 4-19 | trd | — | 0 | —O— | — | — | — | 5 | phe | H |
| 4-20 | non | — | 0 | —O— | — | — | —O— | 5 | phe | H |
| 4-21 | 2-met-hex* | — | 0 | — | — | — | — | 5 | phe | H |
| 4-22 | 2-F-non* | — | 0 | —O— | — | — | — | 5 | phe | H |
| 4-23 | non | — | 0 | — | — | — | — | 5 | phe | H |
| 4-24 | dec | — | 0 | — | — | — | —O— | 5 | phe | H |
| 4-25 | und | — | 0 | — | — | — | —O— | 5 | phe | H |
| 4-26 | non | — | 0 | — | — | — | —O— | 5 | phe | H |
| 4-27 | oct | — | 0 | — | — | — | —O— | 5 | phe | H |
| 4-28 | hep | — | 0 | — | — | — | —O— | 5 | phe | H |
| 4-29 | und | — | 0 | — | — | — | — | 6 | phe | H |
| 4-30 | und | — | 0 | —O— | — | — | — | 6 | phe | H |
| 4-31 | non | — | 0 | — | — | — | — | 6 | phe | H |
| 4-32 | oct | — | 0 | — | — | — | — | 6 | phe | H |
| 4-33 | dec | — | 0 | — | phe | — | —OCO— | 6 | phe | H |
| 4-34 | non | — | 0 | — | — | phe | —O— | 7 | phe | H |
| 4-35 | pro | — | 0 | —O— | — | — | —O— | 7 | phe | H |
| 4-36 | hep | — | 0 | — | — | — | —OCO— | 7 | phe | H |
| 4-37 | dod | — | 0 | — | — | — | —O— | 7 | phe | H |
| 4-38 | oct | — | 0 | — | — | — | —O— | 7 | phe | H |
| 4-39 | dec | — | 0 | — | — | — | —O— | 8 | phe | H |
| 4-40 | eth | — | 0 | —O— | — | — | — | 8 | phe | H |
| 4-41 | hed | — | 0 | — | — | — | —OCO— | 8 | phe | H |
| 4-42 | pen | — | 0 | —O— | — | — | —OCO— | 8 | phe | H |
| 4-43 | dec | — | 0 | — | — | — | — | 8 | phe | H |
| 4-44 | pen | — | 0 | — | — | — | — | 9 | phe | H |
| 4-45 | but | — | 0 | — | — | — | —O— | 9 | phe | H |
| 4-46 | 3-met-pen | — | 0 | — | — | — | —O— | 9 | phe | H |
| 4-47 | hex | — | 0 | — | — | — | —O— | 10 | phe | H |
| 4-48 | dec | — | 0 | — | — | — | —OCO— | 10 | phe | H |
| 4-49 | und | — | 0 | — | — | — | —O— | 10 | phe | H |
| 4-50 | und | — | 0 | — | — | — | —O— | 10 | phe | H |
| 4-51 | pen | — | 0 | —O— | — | — | — | 11 | phe | H |
| 4-52 | hex | — | 0 | — | — | — | —OCO— | 11 | phe | H |
| 4-53 | hep | — | 0 | — | — | — | —OCO— | 11 | phe | H |
| 4-54 | $CF_3$ | — | 0 | — | — | — | — | 12 | phe | H |
| 4-55 | non | — | 0 | — | — | — | —OCO— | 12 | phe | H |
| 4-56 | eth | — | 0 | — | — | — | — | 13 | phe | H |
| 4-57 | but | — | 0 | — | — | — | —COO— | 13 | phe | H |
| 4-58 | met | — | 0 | —O— | — | — | —OCO— | 15 | phe | H |
| 4-59 | met | — | 0 | — | — | — | —O— | 16 | phe | H |
| 4-60 | non | — | 0 | — | — | — | —OCO— | 3 | cyc | H |
| 4-61 | dod | — | 0 | — | — | — | — | 4 | cyc | H |
| 4-62 | und | — | 0 | — | — | — | —O— | 4 | cyc | H |
| 4-63 | dec | — | 0 | —O— | — | — | — | 4 | cyc | H |
| 4-64 | non | — | 0 | — | — | — | —O— | 4 | cyc | H |
| 4-65 | oct | — | 0 | — | — | — | —O— | 4 | cyc | H |
| 4-66 | hep | — | 0 | — | — | — | —O— | 4 | cyc | H |
| 4-67 | hex | — | 0 | — | — | phe | — | 4 | cyc | H |
| 4-68 | dec | — | 0 | — | — | — | —O— | 5 | cyc | H |
| 4-69 | but | — | 0 | — | phe | — | —O— | 5 | cyc | H |
| 4-70 | hex | — | 0 | — | — | — | —O— | 6 | cyc | H |
| 4-71 | hex | — | 0 | — | phe | — | — | 6 | cyc | H |
| 4-72 | und | — | 0 | —COO— | phe | — | —OCO— | 7 | cyc | H |
| 4-73 | dod | — | 0 | — | phe | — | —OCO— | 8 | cyc | H |
| 4-74 | hep | — | 0 | — | — | phe | — | 8 | cyc | H |

-continued

Formula (4) compound

| Ex. Comp. No | $R_{11}$ | $A_{11}$ | n | $X_6$ | $A_{12}$ | $A_{13}$ | $X_7$ | m | $A_{14}$ | $R_{12}$ |
|---|---|---|---|---|---|---|---|---|---|---|
| 4-75 | met | — | 0 | — | phe | — | — | 9 | cyc | H |
| 4-76 | hep | — | 0 | — | — | — | —OCO— | 11 | cyc | H |
| 4-77 | H | phe | 3 | —O— | — | — | — | 0 | — | dec |
| 4-78 | H | phe | 3 | — | — | phe | —O— | 0 | — | 2-met-but |
| 4-79 | H | phe | 4 | — | — | — | — | 0 | — | dec |
| 4-80 | H | phe | 4 | — | — | — | —O— | 0 | — | 2-F-dec |
| 4-81 | H | phe | 4 | —O— | — | — | — | 0 | — | dec |
| 4-82 | H | phe | 4 | — | — | — | — | 0 | — | oct |
| 4-83 | H | phe | 4 | — | — | — | —O— | 0 | — | met |
| 4-84 | H | phe | 4 | — | — | — | —OCO— | 0 | — | 2-THF* |
| 4-85 | H | phe | 4 | — | — | cyc | — | 0 | — | pen |
| 4-86 | H | phe | 4 | — | — | phe | — | 0 | — | hep |
| 4-87 | H | phe | 4 | —O— | — | phe | — | 0 | — | hep |
| 4-88 | H | phe | 4 | — | — | phe | — | 0 | — | pen |
| 4-89 | H | phe | 5 | — | — | — | —O— | 0 | — | 3-CN-pen* |
| 4-90 | H | phe | 5 | —O— | — | — | — | 0 | — | dec |
| 4-91 | H | phe | 5 | —O— | — | — | — | 0 | — | non |
| 4-92 | H | phe | 5 | — | — | phe | — | 0 | — | pro |
| 4-93 | H | phe | 5 | —O— | — | phe | — | 0 | — | hep |
| 4-94 | H | phe | 6 | — | — | — | —O— | 0 | — | 1-pro-O—CO-eth* |
| 4-95 | H | phe | 6 | —O— | — | — | — | 0 | — | dec |
| 4-96 | H | phe | 6 | — | — | — | —OCO— | 0 | — | 1-F*-2-met-pen |
| 4-97 | H | phe | 6 | — | — | — | —O— | 0 | — | met |
| 4-98 | H | phe | 7 | —O— | — | — | —OCO— | 0 | — | 2-THF* |
| 4-99 | H | phe | 7 | —O— | — | — | — | 0 | — | dec |
| 4-100 | H | phe | 7 | —O— | — | — | — | 0 | — | non |
| 4-101 | H | phe | 7 | — | — | — | —OCO— | 0 | — | 2-THF* |
| 4-102 | H | phe | 8 | — | — | — | — | 0 | — | 3-CF$_3$-pen* |
| 4-103 | H | phe | 8 | — | — | — | —O— | 0 | — | 3-CN-hep* |
| 4-104 | H | phe | 8 | —O— | — | — | — | 0 | — | und |
| 4-105 | H | phe | 9 | — | — | — | —O— | 0 | — | 2-Etoxy-pro* |
| 4-106 | H | phe | 9 | — | — | phe | — | 0 | — | but |
| 4-107 | H | phe | 10 | — | — | — | —O— | 0 | — | 1-CF$_3$-hep |
| 4-108 | H | phe | 10 | —O— | — | — | — | 0 | — | pen |
| 4-109 | H | phe | 11 | — | — | — | —OCO— | 0 | — | hex |
| 4-110 | H | phe | 14 | — | — | — | —OCO— | 0 | — | pen |
| 4-111 | H | cyc | 3 | — | — | — | — | 0 | — | non |
| 4-112 | H | cyc | 4 | —O— | — | — | — | 0 | — | dec |
| 4-113 | H | cyc | 5 | — | — | — | —OCO— | 0 | — | 2-CF$_{3\text{-but}}$* |
| 4-114 | H | cyc | 6 | — | — | — | —OCO— | 0 | — | 1-metoxy-eth* |
| 4-115 | H | cyc | 6 | —O— | — | — | — | 0 | — | und |
| 4-116 | H | cyc | 12 | —O— | — | phe | — | 0 | — | pro |

The liquid crystal composition according to the present invention may preferably be prepared by mixing 1–40 wt. % (more preferably 1–30 wt. %, particularly 1–20 wt. %) in total of at least one species of a mesomorphic compound of the formula (1) (or formula (3)), 1–40 wt. % (more preferably 1–30 wt. %, particularly 1–20 wt. %) in total of at least one species of a mesomorphic compound, and at least one species of another mesomorphic compound (or liquid crystal composition) capable of including an optically active compound in an appropriate mixing ratio set for providing desired contrast level or alignment state.

The above optically active compound may preferably be a mesomorphic compound represented by any one of the above-described formulae (1) to (4) or an optically active compound having a central skeleton containing benzene ring and pyridine ring.

The above-mentioned another mesomorphic compound (or another liquid crystal composition) may preferably be constituted by at least one species of mesomorphic compounds represented by the formulae (5), (6), (7) and/or (8) shown below. In a more preferred class of another mesomorphic compound, a liquid crystal composition may be prepared by mixing 20–75 wt. % of a mesomorphic compound of the formula (5), 5–25 wt. % of a mesomorphic compound of the formula (6), 5–30 wt. % of a mesomorphic compound of the formula (7), and 0.1–30 wt. % of a mesomorphic compound of the formula (8).

The above-mentioned another mesomorphic compound of the formulae (5) to (8) may include those shown below:

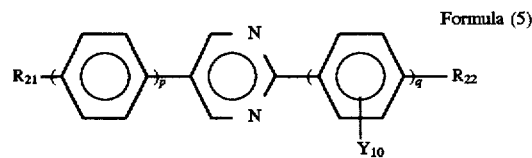

Formula (5)

wherein p and q independently denote 0, 1 or 2 satisfying p+q=1 or 2; $Y_{10}$ is hydrogen or fluorine; and $R_{21}$ and $R_{22}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or CF$_3$ provided that heteroatoms are not adjacent to each other;

wherein $B_1$ is

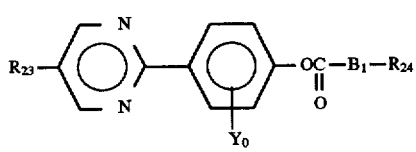
Formula (6)

wherein $B_1$ is

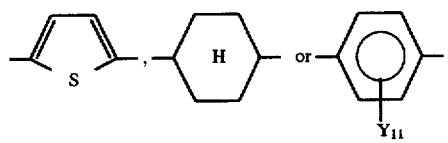

where $Y_{11}$ is hydrogen or fluorine; $Y_0$ is hydrogen or fluorine; $R_{23}$ is a linear or branched alkyl group having 1–18 carbon atoms; $R_{24}$ is hydrogen, halogen, CN, or a linear or branched alkyl group having 1–18 carbon atoms; and at least one methylene group in the alkyl group of $R_{23}$ or $R_{24}$ can be replaced by —O—, —S—, —CO—, —CH=CH—, —C≡C—, or —CHW— where W is halogen, CN or $CF_3$ provided that heteroatoms are not adjacent to each other;

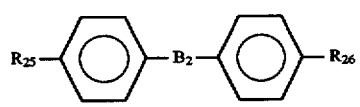
Formula (7)

wherein $B_2$ is

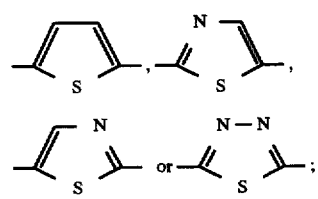

and and $R_{25}$ and $R_{26}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other; and

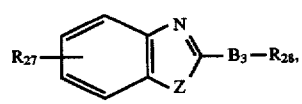
Formula (8)

wherein $B_3$ is

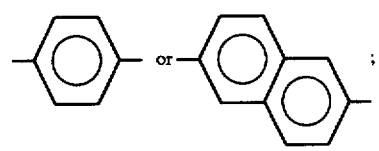

and $R_{27}$ and $R_{28}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other.

In the above formulae (5)–(8), the respective groups $R_{21}$–$R_{28}$ may be an optically active or optically inactive.

In the above another mesomorphic compound of the formulae (5)–(8), the mesomorphic compound of the formula (5) may preferably be any one of a mesomorphic compound of the formula (5-1) to (5-7); the mesomorphic compound of the formula (6) may preferably be any one of a mesomorphic compound of the formula (6-1) to (6-5); the mesomorphic compound of the formula (7) may preferably any one of a mesomorphic compound of the formula (7-1) to (7-9); and the mesomorphic compound of the formula (8) may preferably be any one of a mesomorphic compound of the formula (8-1) to (8-6), respectively shown below:

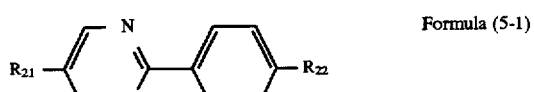
Formula (5-1)

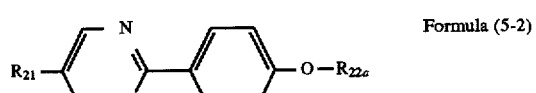
Formula (5-2)

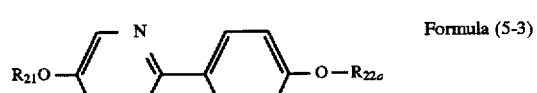
Formula (5-3)

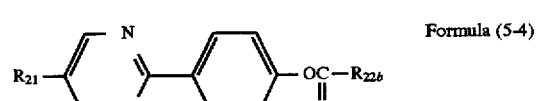
Formula (5-4)

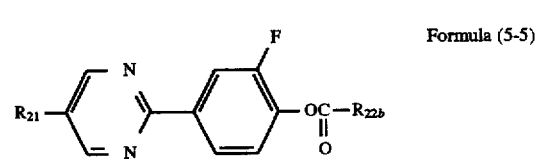
Formula (5-5)

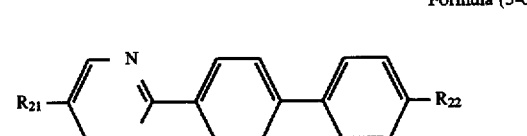
Formula (5-6)

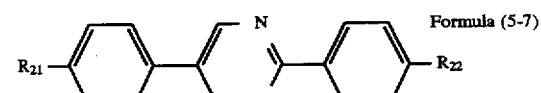
Formula (5-7)

Formula (6-1)

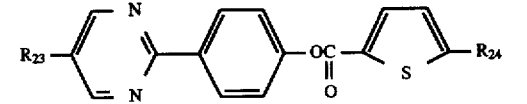
Formula (6-1)

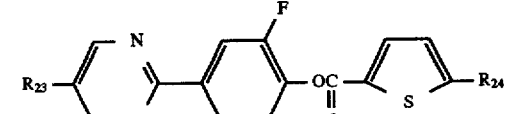
Formula (6-2)

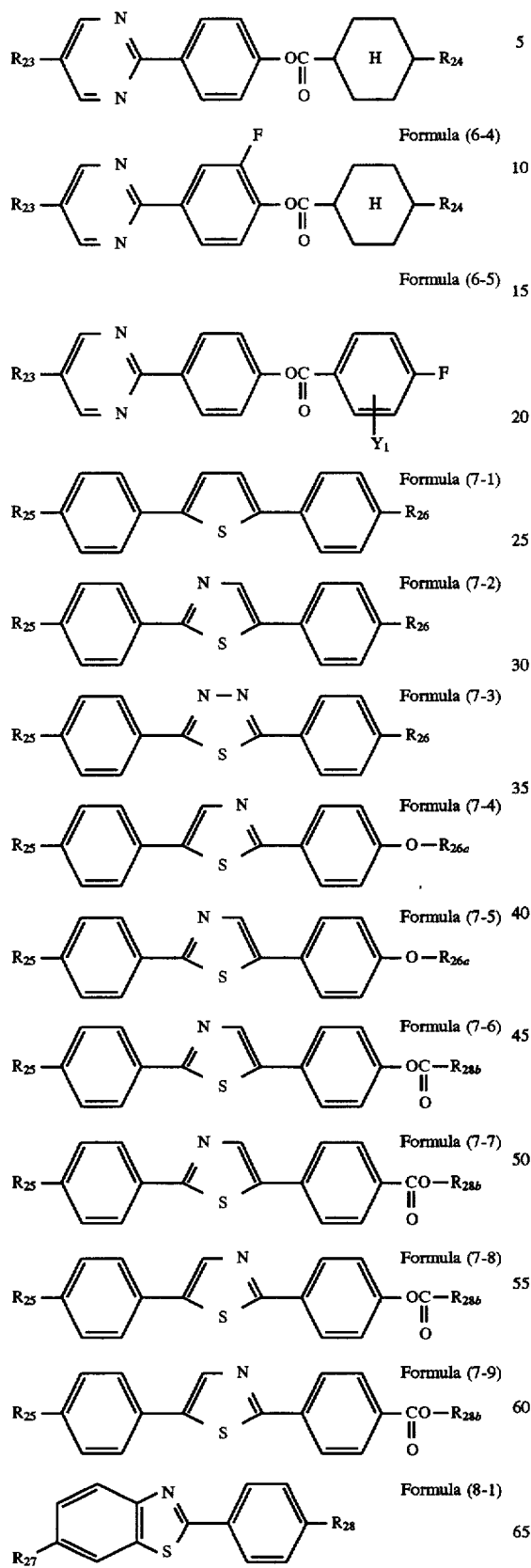
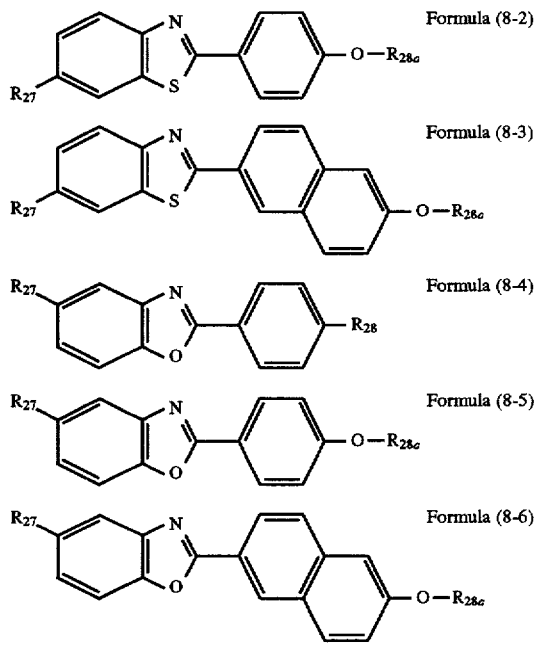

In the above formulae (5-1) to (8-6), $R_{21}$ to $R_{28}$ and $Y_1$ have the same meanings as defined above. Further, $R_{21a}$, $R_{22a}$, $R_{26a}$ and $R_{28a}$ independently denote a linear or branched alkyl group having 1–17 carbon atoms; and $R_{22b}$ and $R_{26b}$ independently denote a linear or branched alkyl group having 1–16 carbon atoms.

In the above formulae (5-1)–(5-5), $R_{21}$ may preferably be a linear alkyl group having 4–14 carbon atoms and $R_{22}$ may preferably be a linear alkyl group having 4–12 carbon atoms. Further, in the above formulae (5-6) and (5-7), $R_{21}$ may preferably be a linear alkyl group having 4–14 carbon atoms and $R_{22}$ may preferably be a linear alkyl group having 4–10 carbon atoms.

In the above formulae (6-1)–(6-5), $R_{23}$ may preferably be a linear alkyl group having 4–14 carbon atoms and $R_{24}$ may preferably be a linear alkyl group having 2–10 carbon atoms.

In the above formulae (7-1)–(7-9), $R_{25}$ may preferably be a linear alkyl group having 2–10 carbon atoms and $R_{26}$ may preferably be a linear alkyl group having 2–12 carbon atoms.

In the above formulae (8-1)–(8-6), $R_{27}$ may preferably be a linear alkyl group having 2–10 carbon atoms and $R_{28}$ may preferably be a linear alkyl group having 4–12 carbon atoms.

The liquid crystal composition of the present invention may preferably assume a chiral smectic phase, particularly a chiral smectic C phase. Further, in order to provide a good uniform alignment to obtain a monodomain state when included in a liquid crystal device. The liquid crystal composition may preferably have phase transition series including an isotropic phase, a cholesteric (chiral nematic), a smectic phase, and a chiral smectic phase (particularly, a chiral smectic C phase) on temperature decrease.

When the liquid crystal composition assumes a chiral smectic C phase, the liquid crystal composition may preferably have a layer inclination angle δ (which is an inherent property of a chiral smectic liquid crystal material) of 3–15 degrees in a temperature range of 0°–60° C.

The liquid crystal device according to the present invention may be constituted by disposing the above-described liquid crystal composition, particularly a chiral smectic liquid crystal composition between a pair of substrates each provided with an electrode for applying a voltage to the liquid crystal composition (herein, sometimes referred to as "electrode plate"). At least one (either one or both) of the electrode plates may preferably be provided with an alignment control layer for controlling an alignment state of the liquid crystal composition. The alignment control layer may be subjected to aligning treatment as desired.

The device according to the present invention may preferably provides a pretilt angle α and the liquid crystal composition (preferably a chiral smectic liquid crystal composition) may preferably be placed in such an alignment state that the chiral smectic liquid crystal shows a cone angle $\widehat{H}$, a layer inclination angle δ in chiral smectic C phase, and an apparent tilt angle θa satisfying the following relationships (I), (II) and (III) in a temperature range of 10°–50° C., particularly at around room temperature (e.g., 30° C.), in combination with the pretilt angle α:

$$\widehat{H} < \alpha + \delta \qquad (I),$$

$$\delta < \alpha \qquad (II),$$

and $$\widehat{H} > \theta a > \widehat{H}/2 \qquad (III).$$

The above C1 uniform conditions (I), (II) and (III) are provided based on the following reason.

Generally, in a liquid crystal device utilizing birefringence of a liquid crystal, the transmittance under right angle cross nicols is given by the following equation:

$$I/I_0 = \sin^2 4\theta a \cdot \sin^2 (\Delta n d/\lambda)\pi,$$

wherein $I_0$: incident light intensity, $I$: transmitted light intensity,

θa: apparent tilt angle,

Δn: refractive index anisotropy, d: thickness of the liquid crystal layer,

λ: wavelength of the incident light.

The apparent tilt angle θa in a non-helical structure is recognized as a half of an angle between the average molecular axis directions of liquid crystal molecules in a twisted alignment (in the thickness direction of the cell or the direction of a normal to the substrate) in a first orientation state and a second orientation state. According to the above equation, it is shown that an apparent tilt angle θa of 22.5 degrees provides a maximum transmittance and the apparent tilt angle θa in a non-helical structure for realizing bistability should desirably be as close as possible to 22.5 degrees in order to provide a high transmittance and a high contrast.

However, it has been found that an apparent tilt angle θa (a half of an angle formed between molecular axes at two stable states) in a ferroelectric liquid crystal with a non-helical structure obtained by alignment with a uniaxially aligned polyimide film as an alignment control film has become smaller as compared with a a cone angle $\widehat{H}$ (the angle $\widehat{H}$ is a half of the apex angle of the cone shown in FIG. 3A as described below) in the ferroelectric liquid crystal having a helical structure. More specifically, the apparent tilt angle θa in a ferroelectric liquid crystal with a non-helical structure was found to be generally on the order of 3–8 degrees, and the transmittance ($I/I_0$) at that time was at most about 3 to 5%.

Figure 2:
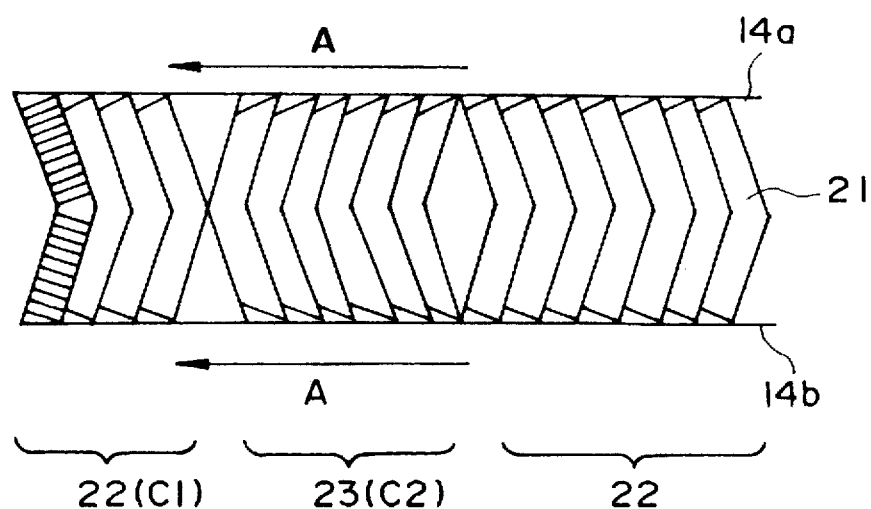
FIG. 2 is an illustration of C1 and C2 alignment states.

Incidentally, a smectic liquid crystal generally has a layer structure and, due to a shrinkage of spacing between layers when it causes a transition from smectic A phase (SmA) to chiral smectic C phase (SmC*), it assumes a chevron structure as shown in FIG. 2 where the layers 21 are bent at a mid point between a pair of substrates provided with alignment control films 14a and 14b.

There are two alignment states depending on the bending directions as shown in FIG. 2, including a C1 alignment state 22 appearing immediately after transition from a higher temperature phase to SmC* phase and a C2 alignment state 23 which appears in mixture with the C1 alignment state on further cooling. It have been further discovered that in C1 alignment state, two stable states providing a high contrast (hereinafter inclusively called "uniform state") are formed in addition to hitherto-found two stable states providing low contrast (hereinafter inclusively called "twist (or splay)") wherein liquid crystal directors are twisted between the substrates.

These states can be transformed from one to the other by applying a certain electric field. More specifically, transition between two twist states is caused under application of weak positive and negative pulse electric fields, and transition between two uniform states is caused under application of strong positive and negative pulse electric fields. By using the two uniform states in C1 alignment, it is possible to realize a display device which is brighter and shows a higher contrast than the conventional devices. Accordingly, it is expected that a display with a higher quality can be realized by using a display device wherein the entire display area is formed in C1 alignment state and the high-contrast two states in C1 alignment (C1 uniform state) are used as two states representing white and black display states.

Figure 3A:
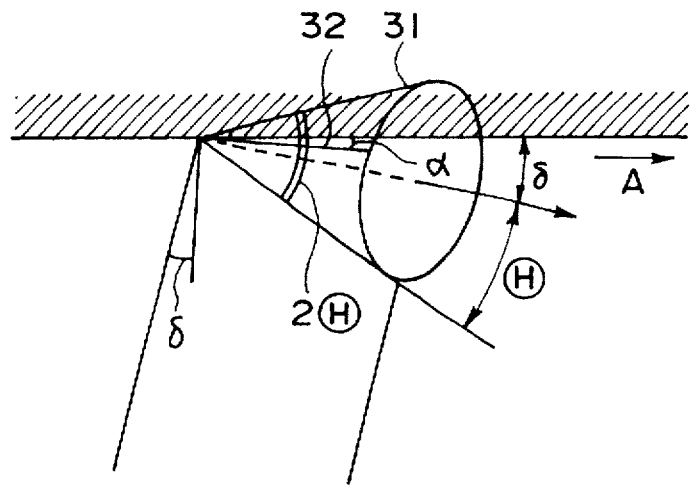
FIGS. 3A and 3B are illustrations of relationship among a cone angle, a pretilt angle and a layer inclination angle in C1 alignment and C2 alignment, respectively.
Figure 3B:
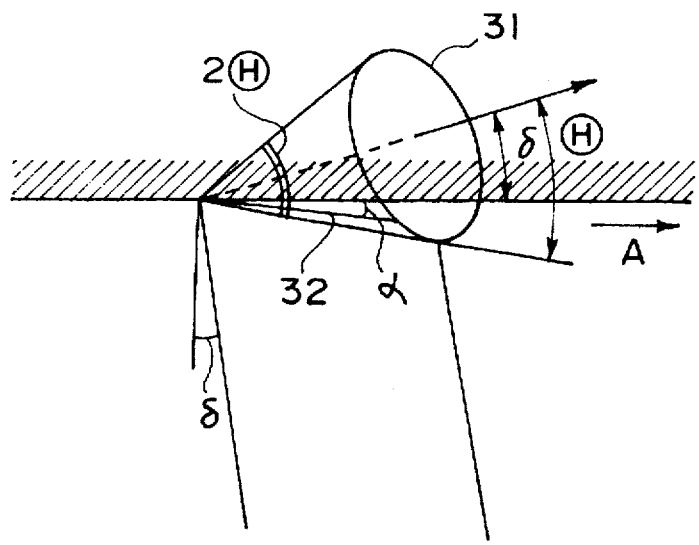

Referring to FIGS. 3A and 3B, directors in the vicinity of the substrates in the C1 alignment and C2 alignment are disposed on cones 31 shown in FIGS. 3A and 3B, respectively. As is well known, as a result of uniaxial aligning treatment, such as rubbing, liquid crystal molecules contacting a substrate surface form a pretilt angle α, the direction of which is such that the liquid crystal molecules 32 raise a forward end up (i.e., spaced from the substrate surface) in the direction of the rubbing indicated by an arrow A (as shown also in FIG. 2). From the above, it is required that the following relationships are satisfied among a cone angle $\widehat{H}$, the pretilt angle α and a layer inclination angle δ (as defined above):

$$\widehat{H} + \delta > \alpha \text{ in C1 alignment,}$$

and $$\widehat{H} \delta > \alpha \text{ in C2 alignment.}$$

Accordingly, the condition for preventing the formation of C2 alignment but allowing C1 alignment is $$\widehat{H} - \delta < \alpha,$$

that is $$\widehat{H} < \alpha + \delta \qquad (I).$$

Further, from simple consideration of a torque acting on a liquid crystal molecule at a boundary surface in switching from one position to the other position under an electric field, the relationship of α > δ ... (II) is given as a condition for easy switching of such a liquid crystal molecule at the boundary.

Accordingly, in order to form the C1 alignment more stably, it is effective to satisfy the condition (II) in addition to the condition (I).

From further experiments under the conditions of (I) and (II), the apparent tilt angle θa is increased from 3–8 degrees obtained when the above conditions (I) and (II) are not satisfied to 8-16 degrees when the above conditions (I) and (II) are satisfied, and also an empirical relationship of (H)>θa≥(H)/2 ... (III) has been also found between the cone angle (H) and apparent tilt angle θa.

As described above, it has been clarified that the satisfaction of the conditions (I), (II) and (III) provides a display device capable of displaying a high-contrast image.

The liquid crystal device according to the present invention may preferably include specific alignment control layers disposed on both opposite surfaces of the pair of substrates. Further, at least one of the alignment control layers may preferably be subjected to a uniaxial aligning treatment for aligning liquid crystal molecules in one direction, so that the respective uniaxial alignment axes may preferably be parallel to each other or intersect with each other at a prescribed crossing angle to control an alignment state of the liquid crystal molecules. In this instances, the liquid crystal device may be preferably satisfy the above C1 uniform conditions (I), (II) and (III).

In order to further stably form the above-mentioned C1 alignment state and uniform alignment state to provide a good alignment state (C1 uniform alignment state), the above-described crossing angle may preferably be in a range of above 0 degrees to at most 25 degrees, more preferably 1-25 degrees. Further, the liquid crystal device may preferably provide a pretilt angle of at least 5 degrees.

A preferred embodiment of the liquid crystal device will now be described with reference to FIG. 1 which is a schematic sectional view of the device. Referring to FIG. 1, the device includes a pair of substrates (glass plates) 11a and 11b coated with transparent electrodes 12a and 12b, respectively, of In₂O₃, SnO₂, ITO (indium tin oxide), etc., then successively further coated with insulating films 13a and 13b and alignment control films, respectively.

The insulating films 13a and 13b may comprise a film of an inorganic substance or an organic substance as shown hereinbelow. Examples of such an inorganic substance may include silicon nitride, silicon carbide containing hydrogen, silicon oxide, boron nitride, boron nitride containing hydrogen, cerium oxide, aluminum oxide, zirconium oxide, titanium oxide, and magnesium fluoride.

The insulating film 13a or 13b may be formed in a single layer or plural layers, as desired, and has a short circuit-preventing function between opposite substrates (opposite electrode). On the insulating film 13a or 13b, it is possible to form a coating-type insulating layer of, e.g., Ti—Si by a coating method. Further, in order to prevent liquid crystal movement at the time of driving a liquid crystal device, the insulating film 13a or 13b may comprise an insulating coating film containing insulating beads, such as silica beads by which the alignment control film formed thereon can be roughened to provide the alignment control film with an uneven surface (not shown).

The alignment control films 14a and 14b may comprise a film of an organic substance or inorganic substance as shown above. Examples of such an organic substance may include polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin.

These insulating films 13a and 13b and alignment control films 14a and 14b may be formed in a single layer of an inorganic or organic insulating alignment control layer as desired.

The alignment control films 14a and 14b may be formed, e.g., by applying and baking a polyamide acid (polyimide precursor) represented by the following formula:

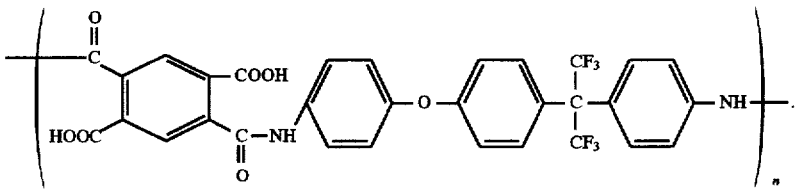

The alignment control film 14a or 14b may be formed in a single layer or plural layers. Further, at least one of such an alignment control films may be subjected to aligning treatment, such as rubbing with, e.g., a gauze or acetate fiber planted cloth.

The insulating films 13a and 13b and alignment control films each comprising an inorganic substance may be formed by vapor deposition, while those each comprising an organic substance may be formed by applying a solution of an organic substance or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The insulating films 13a and 13b and alignment control films 14a and 14b may have a thickness of ordinarily 3–100 nm, preferably 3–300 nm, further preferably 4–100 nm, respectively.

In case where the liquid crystal device is used as a color liquid crystal display device, at least one glass substrates 11a and 11b is provided with a dotted or lined color filter pattern comprising various color materials of red (R), green (G), blue (B), white (W), etc. (not shown).

The color filter pattern formed on the glass substrate may be coated with a smoothing layer comprising an inorganic or organic material so as to minimize a stepwise difference between lines or dots constituting a color filter. Further, between the lines or dots of the color filter, a black light-interrupting (masking) layer comprising a metal or resin material may preferably be disposed (not shown) in order to prevent color-mixing of the respective colors. In such a color liquid crystal display device, the transparent electrode 11a and 11b may be designed in a prescribed pattern depending on the shape of the color filter pattern.

Between the substrates 11a and 11b is disposed a liquid crystal composition 15, and the spacing between the substrates 11a and 11b is set to a value (e.g., 0.1–20 µm, preferably 0.1–3 µm). The small spacing (e.g., 0.1–3 µm) is sufficiently small to suppress the formation of a helical structure of the (chiral smectic) liquid crystal composition 15, thus resulting in bistable alignment states of the liquid crystal composition 15. The small spacing is held by spacer beads 16 composed of, e.g., silica, alumina, polymer film, glass fiber, etc., dispersed between the substrates. Further, it is possible to dispose particles of an adhesive agent between the spacing in order to hold the spacing formed by spacer beads 16.

The periphery of the glass substrates 11a and 11b is sealed up with a sealing agent (not shown) such as an epoxy adhesive.

Further, outside the glass substrates 11a and 11b, a pair of polarizers 17a and 17b are applied to the respective glass substrates.

Incidentally, the crossing agent referred to herein as described above may be defined as follows.

The crossing angle may be determined by an angle in the counterclockwise direction formed between a uniaxial alignment axis provided to the upper alignment film 14a and that provided to the lower alignment film 14b on the basis of the former axis. These alignment axes may preferably be directed in the same direction and intersect with each other at a crossing angle of within ±25 degrees, preferably at a crossing angle of above 0 degrees (as absolute value) and at most 25 degrees (as absolute value), particularly 1–25 degrees (as absolute value).

In forming a transmission-type liquid crystal device, the liquid crystal apparatus of the present invention may include a light source (not shown) dispersed outside either one of the polarizers 17a and 17b.

The liquid crystal apparatus may include the above-mentioned liquid crystal device, drive means (e.g., drive circuit) and a light source as a backlight. The liquid crystal apparatus may preferably be a liquid crystal display apparatus.

Figure 7:
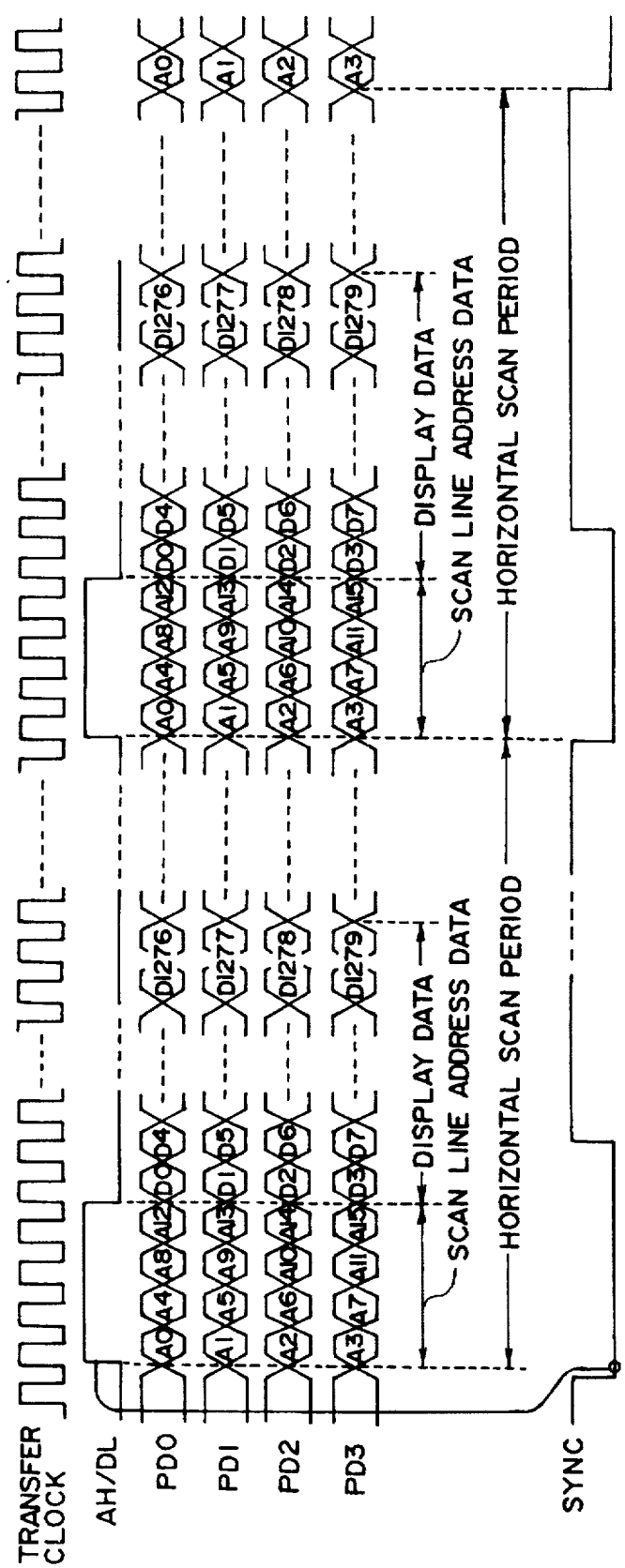
FIG. 7 is a time chart showing time correlation for image data communication between the liquid crystal display apparatus and the graphic controller.

The liquid crystal display apparatus may be constituted by using the liquid crystal device for a display panel and by adopting an arrangement and data format comprising image data accompanied with scanning line address data and also a communication synchronization scheme using a SYNC signal as shown in FIGS. 6 and 7.

Referring to FIG. 6, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to the display panel 103 (illuminated with a backlight (not shown)) by signal transfer means shown in FIGS. 6 and 7. The graphic controller 102 principally comprises a CPU (or GCPU, central processing unit) 112 and a VRAM (video-RAM, image data storage memory) 114 and is in charge of management and communication of image data between a host CPU 113 and the liquid crystal display apparatus (FLCD) 101. The control of image display according to the present invention is principally accomplished by the graphic controller 102. Incidentally, a light source is disposed at the back of the display panel 103.

A simple matrix-type display apparatus using a liquid crystal device comprising a (chiral smectic or ferroelectric) liquid crystal composition disposed between a pair of substrates as described above may be driven by driving methods as disclosed by, e.g., JP-A 59-193426, JP-A 59-193427, JP-A 60-156046 and JP-A 60-156047.

Figure 5:
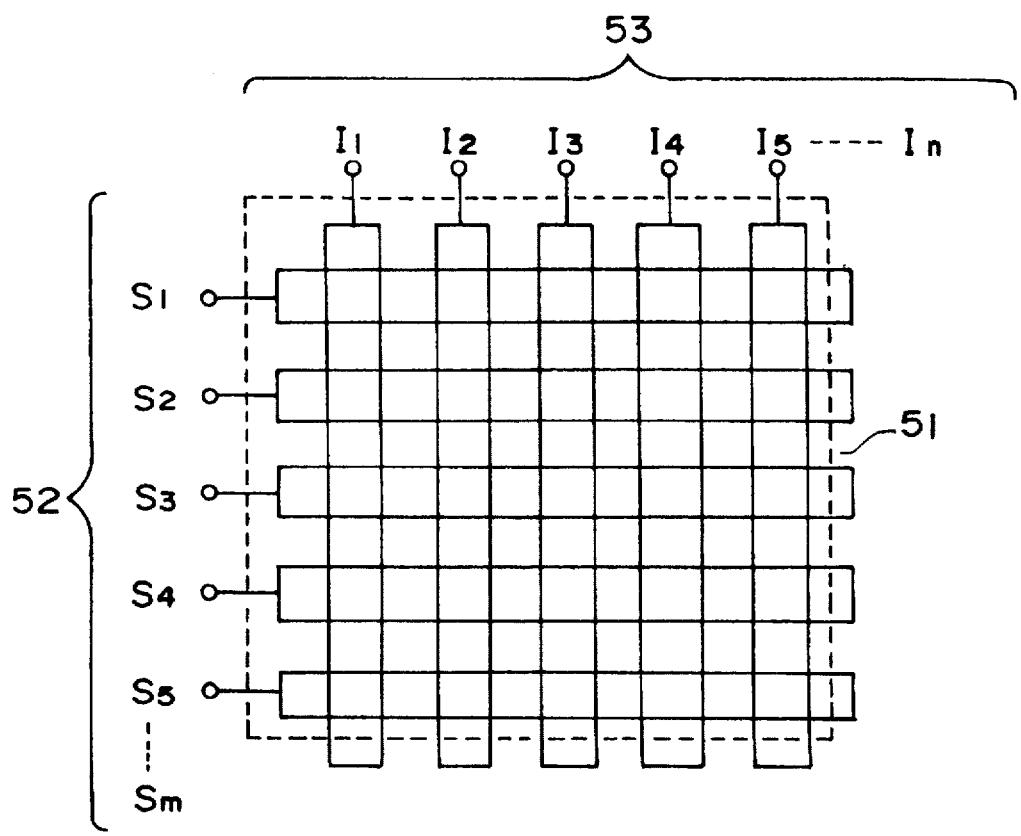
FIG. 5 is a plan view of an electrode matrix.
Figure 8A:
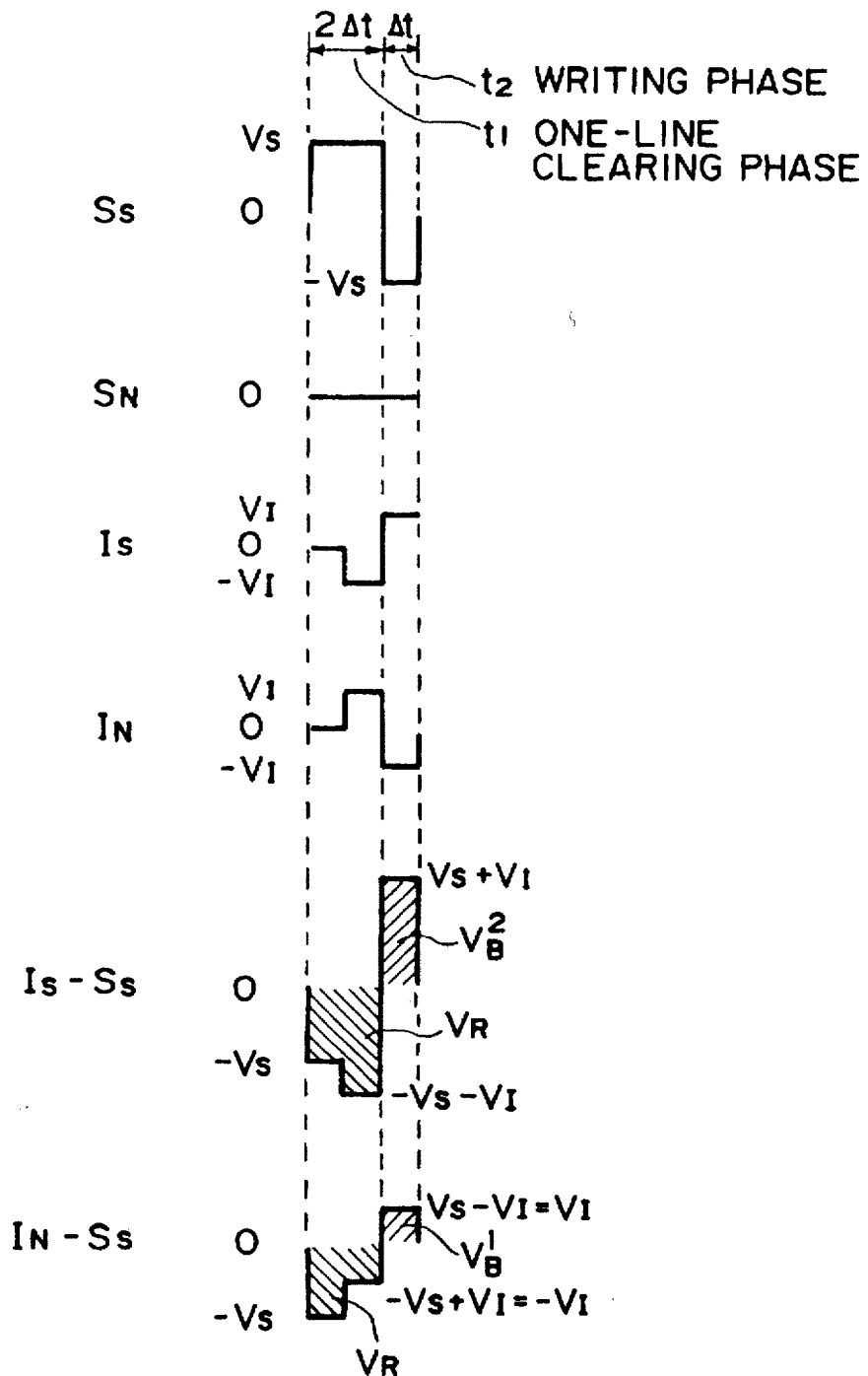
FIG. 8A shows unit driving waveforms used in an embodiment of the present invention and FIG. 8B is time-serial waveforms comprising a succession of such unit waveforms.
Figure 8B:
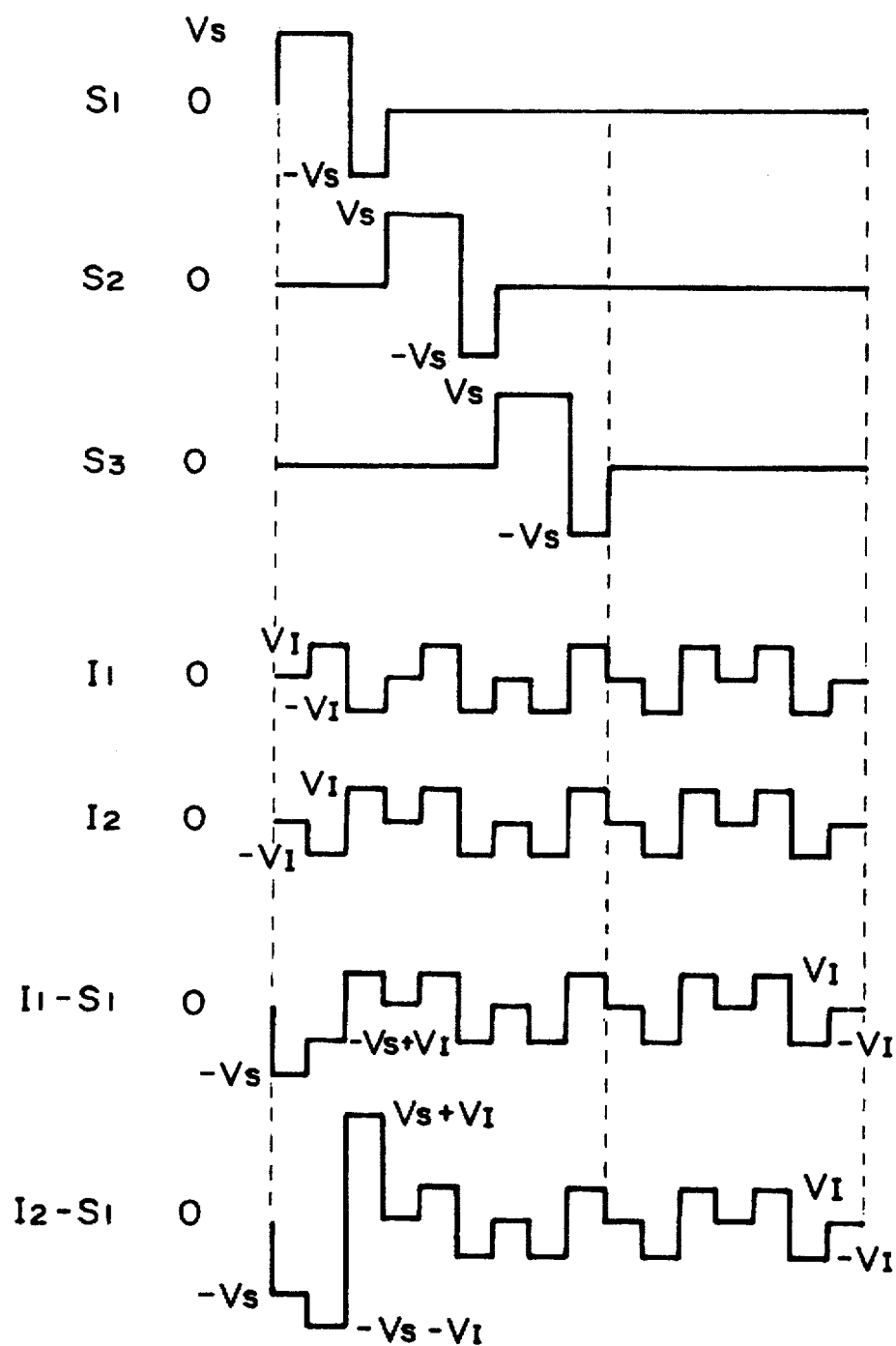

FIGS. 8A and 8B are waveform diagrams showing an example set of driving waveforms used in such a driving method. FIG. 5 is a plan view showing an electrode matrix used in a chiral smectic liquid crystal panel 51 of a simple matrix-type. The liquid crystal panel 51 shown in FIG. 6 includes scanning electrodes 52 and data electrodes 53 intersecting each other so as to constitute a pixel at each intersection together with a chiral smectic liquid crystal disposed between the scanning electrodes 52 and data electrodes 53.

Figure 9:
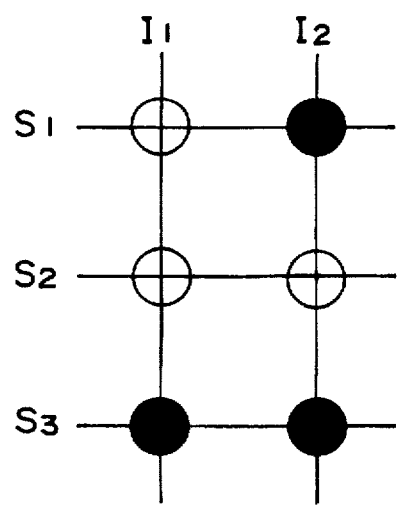
FIG. 9 is an illustration of a display pattern obtained by an actual drive using the time-serial waveforms shown in FIG. 8B.

Referring to FIG. 8A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a nonselected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 8B shows a time-serial waveform used for providing a display state as shown in FIG. 9.

In the driving embodiment shown in FIGS. 5A and 5B, a minimum duration $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 8A and 8B are determined depending on switching characteristics of a ferroelectric liquid crystal material used.

Figure 10:
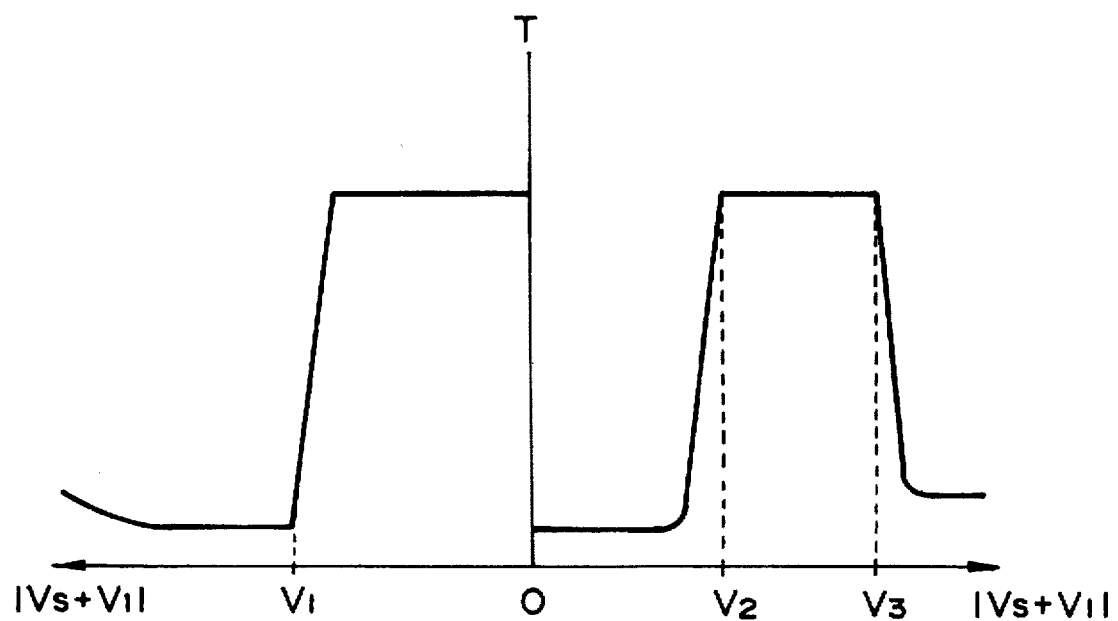
FIG. 10 is a V-T characteristic chart showing a change in transmittance under application of different drive voltages.

FIG. 10 shows a V–T characteristic, i.e., a change in transmittance T when a driving voltage denoted by $(V_S+V_I)$ is changed while a bias ratio as mentioned hereinbelow is kept constant. In this embodiment, the parameters are fixed at constant values of $\Delta t=50$ μs and a bias ratio $V_I/(V_I+V_S) =1/3$. On the right side of FIG. 10 is shown a result when the voltage $(I_N$–$S_S)$ shown in FIG. 8A is applied to a pixel concerned, and on the left side of FIG. 10 is shown a result when the voltage $(I_S$–$S_S)$ is applied to a pixel concerned, respectively while increasing the voltage $(V_S+V_I)$. On both sides of the ordinate, the absolute value of the voltage $(V_S+V_I)$ is separately indicated. At $(I_N$–$S_S)$ and $(I_S$–$S_S)$, a previous (display) state is cleared by applying a voltage $V_R$ and a subsequent (display) state is determined by voltages $V_B^1$ and $V_B^2$, respectively. Referring to FIG. 10, a relationship of $V_2<V_1<V_3$ holds. The voltage $V_1$ may be referred to as a threshold voltage in actual drive and the voltage $V_3$ may be referred to as a crosstalk voltage. More specifically, as shown in FIG. 8A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. In an actual drive, $\Delta V=(V_3-V_1)$ provides a range of $|V_S+V_I|$ allowing a matrix drive and may be referred to as a drive voltage margin (or drive margin), which is preferably large enough. It is of course possible to increase the value of $V_3$ and thus $\Delta V$ $(=V_3-V_1)$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/4 was practical. On the other hand, when the bias ratio is fixed, the voltage margin $\Delta V$ strongly depends on the switching characteristics of a liquid crystal material used, and it is needless to say that a liquid crystal material providing a large $\Delta V$ is very advantageous for matrix drive.

The upper and lower limits of application voltages and a difference therebetween (driving voltage margin $\Delta V$) by which selected pixels are written in two states of "black" and "white" and non-selected pixels can retain the written "black" and "white" states at a constant temperature as described above, vary depending on and are inherent to a particular liquid crystal material used. Further, the driving margin is deviated according to a change in environmental temperature, so that optimum driving conditions should be required of an actual display apparatus in view of a liquid crystal material used, a device structure and an environmental temperature.

The values of cone angle $\widehat{H}$, apparent tilt angle θa, layer inclination angle δ in smectic layer, pretilt angle α and spontaneous polarization Ps referred to herein are based on values measured according to the following methods.

Measurement of cone an $\widehat{H}$

A liquid crystal device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K.K.) to find a first extinct position (a position providing the lowest transmittance) and a second extinct position. A cone angle $\widehat{H}$ was measured as a half of the angle between the first and second extinct positions.

Measurement of apparent tilt angle θa

A liquid crystal device sandwiched between right angle cross nicol polarizes was supplied with a single pulse of one polarity exceeding the threshold voltage of the ferroelectric liquid crystal and was then rotated under no electric field horizontally relative to the polarizers to find a first extinction position. Then, the liquid crystal device was supplied with a single pulse of the opposite polarity exceeding the threshold voltage of the ferroelectric liquid crystal and was then rotated under no electric field relative to the polarizers to find a second extinct position. An apparent tilt angle θa was measured as a half of the angle between the first and second extinct positions.

Measurement of liquid crystal layer inclination angle δ

The method used was basically similar to the method used by Clark and Largerwal (Japanese Display '86, Sep. 30–Oct. 2, 1986, p.p. 456–458) or the method of Ohuchi et al (J.J.A.P., 27 (5) (1988), p.p. 725–728). The measurement was performed by using a rotary cathode-type X-ray diffraction apparatus (available from MAC Science), and 80 μm-thick microsheets (available from Corning Glass Works) were used as the substrates so as to minimize the X-ray absorption with the glass substrates of the liquid crystal cells.

Measurement of pretilt angle α

The measurement was performed according to the crystal rotation method as described at Jpn. J. Appl. Phys. vol. 19 (1980), No. 10, Short Notes 2013.

More specifically, a cell was filled with a standard liquid crystal mixture for measurement assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

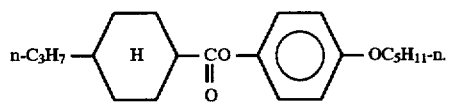

For measurement, the liquid crystal cell provided with an objective alignment control layer was rotated in a plane perpendicular to the pair of substrates and including the aligning treatment axis (rubbing axis) and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

A pretilt angle α was obtained through a simulation wherein a fitting of a spectrum of the intensity of the transmitted light formed by interference was effected with respect to the following theoretical curve (a) and relationship (b):

$$T(\phi) = \cos^2\left[\frac{\pi d}{\lambda}\left(\frac{NeNo\sqrt{N^2(\alpha) - \sin^2\phi}}{N^2(\alpha)} - \sqrt{No^2 - \sin^2\phi} - \frac{Ne^2 - No^2}{N^2(\alpha)}\sin\alpha \cdot \cos\alpha \cdot \sin\phi\right)\right] \quad (a)$$

$$N(\alpha) \equiv \sqrt{No^2 \cdot \cos^2\alpha + Ne^2 \cdot \sin^2\alpha} \quad (b)$$

wherein No denotes the refractive index of ordinary ray, Ne denotes the refractive index of extraordinary ray, φ denotes the rotation angle of the cell, T(φ) denotes the intensity of the transmitted light, d denotes the cell thickness, and λ denotes the wavelength of the incident light.

Measurement of spontaneous polarization Ps

The spontaneous polarization Ps was measured according to "Direct Method with Triangular Waves for Measuring Spontaneous Polarization in Ferroelectric Liquid Crystal", as described by K. Miyasato et al (Japanese J. Appl. Phys. 22, No. 10, L661 (1983)).

Hereinbelow, the present invention will be described more specifically based on Examples to which the present invention is not intended to be limited, however.

EXAMPLE 1

(1) A (base) liquid crystal composition A (Composition A) was prepared by mixing the following compounds in the indicated properties.

| Structural Formula | wt. parts |
|---|---|
| [C5H11–phenyl–N=N(S)–phenyl–C5H11] | 5.5 |
| [C6H13–phenyl–N=N(S)–phenyl–C4H9] | 5.5 |
| [C11H23–pyridyl–phenyl–OC(O)–thienyl–C4H9] | 7.5 |
| [C11H23–pyridyl–(F)phenyl–OC(O)–thienyl–C4H9] | 3.5 |

-continued

| Structural Formula | wt. parts |
|---|---|
| C6H13—[benzothiazole]—[phenyl]—OC8H17 | 22.0 |
| C6H13—[pyrimidine]—[phenyl]—OC12H25 | 4.5 |
| C8H17—[pyrimidine]—[phenyl]—OC9H19 | 9.0 |
| C8H17—[pyrimidine]—[phenyl]—OC10H21 | 9.0 |
| C9H19—[pyrimidine]—[phenyl]—OC8H17 | 4.5 |
| C10H21—[pyrimidine]—[phenyl(F)]—OCH2C*HC6H13 | 11.0 |
| C10H21O—[phenyl]—CO—O—[phenyl]—OCH2CHC2H5(CH3) | 18.0 |

The liquid crystal composition A showed the following phase transition series, spontaneous polarization Ps and cone angle Ⓗ.

Phase transition temperature (°C.).

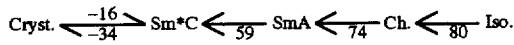

Herein, the respective symbols in the phase transition series represent the following phases:
Cryst.: crystal phase,
Sm*C: chiral smectic C phase,
SmA: smectic A phase,
Ch: cholesteric phase (chiral nematic phase), and
Iso: isotropic phase.

Ps (nC/cm²)=10.2 (at 30° C.)

Ⓗ (degrees)=18.1 (at 30° C.)

Then, two glass substrates each provided with a transparent electrode were respectively coated with a thin film of tantalum oxide by sputtering. Onto the respective tantalum oxide films formed on the two glass substrates, a 1%-solution in NMP (N-methyl-2-pyrrolidone) of a polyamic acid ("LQ 1802", mfd. by Hitachi Kasei K.K.) having the structural formula described above was applied by using a spinner, respectively, followed by baking for 1 hour at 270° C. to form an alignment film.

The thus prepared two substrates were subjected to rubbing treatment and were applied to each other with a gap of the order of 1.2–1.3 µm so as to have uniaxial alignment (or rubbing treatment) axes extending in the same direction but intersecting with each other at an intersection (or crossing) angle of 10 to form a blank cell. The cell showed an pretilt angle a of 17 degrees (DEG.) as measured according to the crystal rotation method.

Into the cell, the liquid crystal composition A placed in an isotropic liquid crystal (by heating) as injected. Thereafter, the liquid crystal composition A was gradually cooled from isotropic phase temperature to 25° C. at a rate of 20° C./hr to prepare a (ferroelectric) liquid crystal device.

When the liquid crystal device (Device A) was subjected to visual observation through a microscope for evaluating a uniform aligning characteristic, the liquid crystal device showed an alignment including 95% of uniform alignment and 5% of twist alignment, thus failing to provide homogeneous uniform alignment over the entire liquid crystal device. Further, the liquid crystal device (or composition) provided a layer inclination angle δ of 12.0 degrees and an apparent tilt angle of 12.5 degrees.

Figure 4:
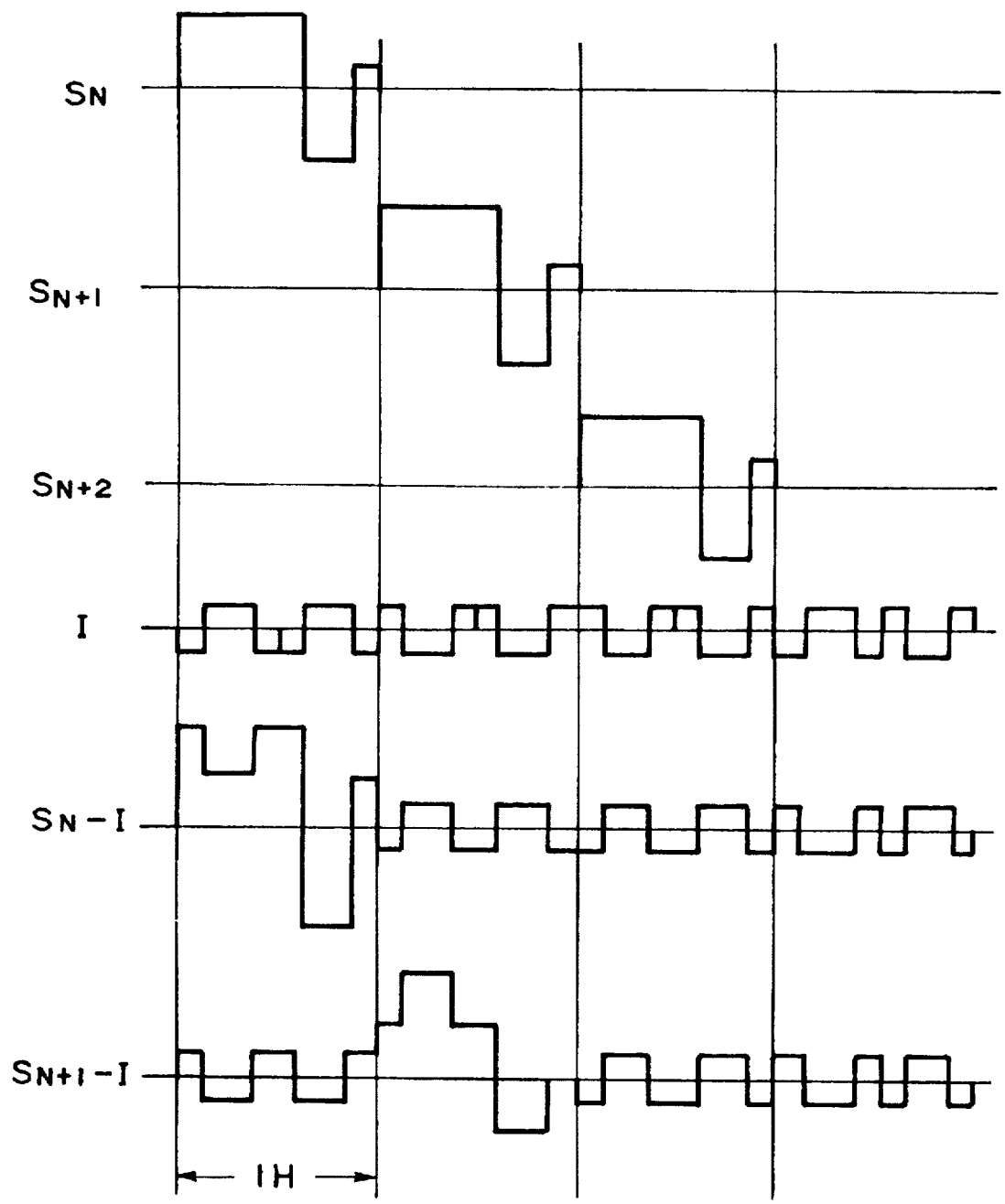
FIG. 4 is a waveform diagram illustrating driving waveforms used in an embodiment of the present invention.

Further, the liquid crystal device was driven by applying a set of driving waveforms shown in FIG. 4 (bias ratio=⅓) to measure a drive voltage margin (drive margin) ΔV (=$V_3 - V_1$) while setting set Δt so as to provide $V_1 \approx 15$ volts. The results are shown below.

| <Device A> | 10° C. | 20° C. | 30° C. | 40° C. |
|---|---|---|---|---|
| Drive margin (V) | 2.1 | 3.0 | 4.1 | 4.0 |
| Set Δt (µsec) | 221 | 126 | 86 | 60 |

Further, when the liquid crystal device was subjected to measurement of contrast ratio, the liquid crystal device showed a contrast ratio of 28.

(2) A liquid crystal composition 1-AI (Composition 1-AI) was prepared by mixing the following example compound with Composition A in the indicated proportions.

| Ex. Comp. No. | Structural formula | wt. parts |
|---|---|---|
| 3-4 | C10H21—[pyrimidine]—[phenyl-indane]—C8H17 | 10 |
| | Composition A | 90 |

The liquid crystal composition 1-AI showed the following phase transition series, spontaneous polarization Ps and cone angle Ⓗ.

Phase transition temperature (°C.)

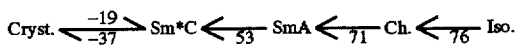

Ps (nC/cm²)=6.4 (at 30° C.)

Ⓗ (degrees)=15.2 (at 30° C.)

A liquid crystal device (Device 1-AI) was prepared and evaluated in the same manner as (1) described above except that Composition 1-AI was used. The results are shown below.

<Device 1-AI>
Uniform alining characteristic

Homogeneous uniform alignment was observed over the almost entire area of the liquid crystal device. The liquid crystal device (or composition) also provided a layer inclination angle δ of 10.3 degrees and an apparent tilt angle θa of 10.8 degrees.

|  | 10° C. | 20° C. | 30° C. | 40° C. |
|---|---|---|---|---|
| Drive margin (V) | 4.4 | 5.1 | 6.8 | 4.0 |
| Set Δt (μsec) | 214 | 114 | 80 | 55 |
| Contrast ratio: | 41 (at 30° C.) | | | |

(3) A liquid crystal composition 1-AII (Composition 1-AII) was prepared by mixing the following example compound with Composition A in the indicated proportions.

| Ex. Comp. No. | Structural formula | wt. parts |
|---|---|---|
| 4-10 | 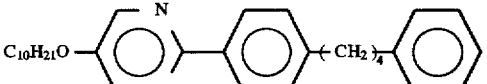 | 10 |
| | Composition A | 90 |

The liquid crystal composition 1-AII showed the following phase transition series, spontaneous polarization Ps and cone angle Ⓗ.
Phase transition temperature (°C.)

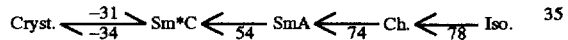

Ps (nC/cm²)=6.8 (at 30° C.)

Ⓗ (degrees)=14.8 (at 30° C.)

A liquid crystal device (Device 1-AII) was prepared and evaluated in the same manner as (1) described above except that Composition 1-AII was used. The results are shown below.
<Device 1-AII>
Uniform aligning characteristic Homogeneous uniform alignment was observed over the entire area of the liquid crystal device. The liquid crystal device (or composition) also provided a layer inclination angle δ of 9.5 degrees and an apparent tilt angle θa of 10.1 degrees.

|  | 10° C. | 20° C. | 30° C. | 40° C. |
|---|---|---|---|---|
| Drive margin (V) | 4.0 | 4.8 | 6.7 | 3.8 |
| Set Δt (μsec) | 199 | 108 | 74 | 49 |
| Contrast ratio: | 42 (at 30° C.) | | | |

(4) A liquid crystal composition 1-AIII (Composition 1-AIII) was prepared by mixing the following example compound with Composition A in the indicated proportions.

| Ex. Comp. No. | Structural formula | wt. parts |
|---|---|---|
| 3-4 | 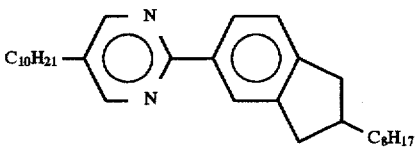 | 5 |
| 4-10 | 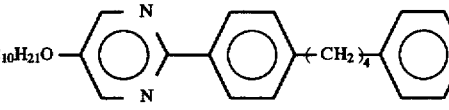 | 5 |
| | Composition A | 90 |

The liquid crystal composition 1-AIII showed the following phase transition series, spontaneous polarization Ps and cone angle Ⓗ.
Phase transition temperature (°C.)

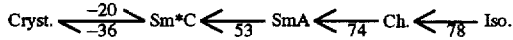

Ps (nC/cm²)=7.1 (at 30° C.)

$\widehat{H}$ degrees)=14.9 (at 30° C.)

A liquid crystal device (Device 1-AIII) was prepared and evaluated in the same manner as (1) described above except that Composition 1-AIII was used. The results are shown below.
<Device 1-AIII>
Uniform aligning characteristic Homogeneous uniform alignment was observed over the entire area of the liquid crystal device. The liquid crystal device (or composition) also provided a layer inclination angle δ of 9.7 degrees and an apparent tilt angle θa of 10.4 degrees.

|  | 10° C. | 20° C. | 30° C. | 40° C. |
|---|---|---|---|---|
| Drive margin (V) | 4.3 | 4.9 | 6.8 | 4.1 |
| Set Δt (μsec) | 194 | 108 | 74 | 52 |
| Contrast ratio: | 48 (at 30° C.) | | | |

Comparative Example 1

A liquid crystal composition 1-AIV (Composition 1-AIV) was prepared by mixing the following comparative compound (instead of the compound (Ex. Comp. No. 3–4) used in (1) of Example 1 described above) with Composition A in the indicated proportions.

| Structural formula | wt. parts |
|---|---|
| $C_{10}H_{21}$—[pyrazine ring]—[phenyl]—$OC_8H_{17}$ | 10 |
| Composition A | 90 |

The liquid crystal composition 1-AIV showed the following phase transition series, spontaneous polarization Ps and cone angle $\widehat{H}$
Phase transition temperature

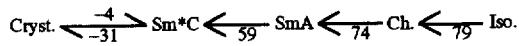

Ps (nC/cm²)=7.3 (at 30° C.)

$\widehat{H}$ (degrees)=18.0 (at 30° C.)

A liquid crystal device (Device 1-AIV) was prepared and evaluated in the same manner as (1) of Example 1 described above except that Composition 1-AIV was used. The results are shown below.
<Device 1-AIV>
Uniform aligning characteristic The liquid crystal device showed an alignment including 95% of uniform alignment and 5% of twist alignment. As a result, homogeneous uniform alignment was not observed over the entire area of the liquid crystal device. The liquid crystal device (or composition) also provided a layer inclination angle δ of 12.0 degrees and an apparent tilt angle θa of 12.4 degrees.

|  | 10° C. | 20° C. | 30° C. | 40° C. |
|---|---|---|---|---|
| Drive margin (V) | 2.1 | 3.2 | 4.4 | 4.3 |
| Set Δt (μsec) | 240 | 130 | 89 | 62 |
| Contrast ratio: | 32 (at 30° C.) | | | |

The results of Example 1 and Comparative Example 1 are summarized as follows.

| Ex. | Compo-sition | Ex. Comp. No. (3) | Ex. Comp. No. (4) | Align-ment[*1] | $f^{10/40}$[*2] | Con-trast |
|---|---|---|---|---|---|---|
| 1 (1) | A | — | — | Δ | 3.68 | 28 |
| 1 (2) | 1-AI | 3–4 | — | o | 3.89 | 41 |
| 1 (3) | 1-AII | — | 4–10 | o | 4.06 | 42 |
| 1 (4) | 1-AIII | 3–4 | 4–10 | o | 3.73 | 48 |
| Comp. Ex. 1 | 1-AIV | comparative | — | Δ | 3.87 | 32 |

[*1] o represents (100% of) homogeneous C1 uniform alignment.
Δ represents alignment including 95% of uniform alignment and 5% of twist alignment.
[*2] $f^{10/40}$ represents a temperature-dependence (factor) of set Δt, i.e., a ratio of a set Δt at 10° C. to a set Δt at 40° C.

As apparent from the above results, the liquid crystal compositions 1-AI, 1-AII and 1-AIII improved the uniform aligning characteristic of the (base) liquid crystal composition A showing a uniform alignment state including 5% of a twist alignment state.

However, the liquid crystal compositions 1-AI and 1-AII among the above compositions fails to improve a temperature characteristic ($f^{10/40}$; temperature-dependence of set Δt) of the liquid crystal composition A ($f^{10/40}$=3.68) since the liquid crystal compositions 1-AI and 1-AII provided rather worse values ($f^{10/40}$=3.89 for Composition 1-AI and 4.06 for Composition 1-AII), respectively.

On the other hand, the liquid crystal composition 1-AIII, using the mesomorphic compounds of the formulae (3) and (4), according to the present invention provided a substantially similar (or slightly increased) temperature characteristic and a remarkably improved contrast ratio when compared with those of the liquid crystal composition A.

Further, the liquid crystal composition 1-AIV used in Comparative Example 1 wherein the comparative mesomorphic compound was used failed to provide improvements in uniform aligning characteristic, temperature characteristic ($f^{10/40}$) and contrast ratio.

Accordingly, the liquid crystal composition (Composition 1-AIII) according to the present invention was confirmed that the liquid crystal composition provided a balanced performance with respect to improvements in uniform aligning characteristic, temperature characteristic ($f^{10/40}$) and contrast ratio.

EXAMPLE 2

Liquid crystal compositions 2-AI, 2-AII and 2-AIII (Compositions 2-AI, 2-AII and 2-AIII) were prepared in the same manner as in Example 1 except for using the following example compounds in the indicated proportions, respectively.

| Composition | Ex. Comp. No. | Structural formula | wt. parts |
|---|---|---|---|
| 2-AI | 3-22 | $C_{12}H_{25}$—[pyrimidine]—[phenyl]—[indanyl]—$C_6H_{13}$ | 15 |
|  |  | Composition A | 85 |
| 2-AII | 4-86 | [phenyl]—$(CH_2)_4$—[pyrimidine]—[phenyl]—[phenyl]—$C_7H_{15}$ | 15 |
|  |  | Composition A | 85 |
| 2-AIII | 3-22 | $C_{12}H_{25}$—[pyrimidine]—[phenyl]—[phenyl]—[indanyl]—$C_6H_{13}$ | 10 |
|  | 4-86 | [phenyl]—$(CH_2)_4$—[pyrimidine]—[phenyl]—[phenyl]—$C_7H_{15}$ | 5 |
|  |  | Composition A | 85 |

The liquid crystal compositions 2-AI, 2-AII and 2-AIII showed the following phase transition series, spontaneous polarization Ps and cone angle (H), respectively.

<Composition 2-AI>
Phase transition temperature (°C.)

$$\text{Cryst.} \xrightarrow[-23]{-10} \text{Sm*C} \xrightarrow{58} \text{SmA} \xrightarrow{76} \text{Ch.} \xrightarrow{85} \text{Iso.}$$

Ps (nC/cm$^2$)=7.3 (at 30° C.)

(H) (degrees)=15.4 (at 30° C.)

<Composition 2-AII>
Phase transition temperature (°C.)

$$\text{Cryst.} \xrightarrow[-15]{-8} \text{Sm*C} \xrightarrow{64} \text{SmA} \xrightarrow{84} \text{Ch.} \xrightarrow{95} \text{Iso.}$$

Ps (nC/cm$^2$)=7.2 (at 30° C.)

(H) (degrees)=18.2 (at 30° C.)

<Composition 2-AIII>
Phase transition temperature (°C.)

$$\text{Cryst.} \xrightarrow[-21]{-7} \text{Sm*C} \xrightarrow{60} \text{SmA} \xrightarrow{81} \text{Ch.} \xrightarrow{90} \text{Iso.}$$

Ps (nC/cm$^2$)=6.8 (at 30° C.)

(H) (degrees)=15.6 (at 30° C.)

Liquid crystal devices (Devices 2-AI, 2-AII and 2-AIII) were prepared and evaluated in the same manner as (1) of Example 1 described above except that Compositions 2-AI, 2-AII and 2-AIII were used, respectively. The results are shown below.

<Device 2-AI>
Uniform aligning characteristic
Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 5.2 | 6.0 | 7.5 | 7.6 | 2.1 |
| Set Δt (μsec) | 284 | 146 | 96 | 68 | 41 |
| Contrast ratio: | 41 (at 30° C.) | | | | |

<Device 2-AII>
Uniform aligning characteristic
Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 5.0 | 6.2 | 6.8 | 6.8 | 2.6 |
| Set Δt (μsec) | 298 | 150 | 98 | 69 | 42 |
| Contrast ratio: | 31 (at 30° C.) | | | | |

<Device 2-AIII>
Uniform aligning characteristic
Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 5.4 | 6.1 | 7.5 | 7.6 | 2.5 |
| Set Δt (μsec) | 264 | 140 | 93 | 66 | 40 |
| Contrast ratio: | 49 (at 30° C.) | | | | |

As apparent from Example 2, the liquid crystal compositions 2-AI and 2-AII provided an improved uniform aligning characteristic but showed inferior temperature characteristic ($f^{10/40}$=(set Δt at 10° C./set Δt at 40° C.) 4.18 for Composition 2-AI and 4.32 for Composition 2-AII) when compared with the (base) liquid crystal composition A ($f^{10/40}$=3.68). Regarding the contrast ratio (at 30° C.), the liquid crystal composition 2-AI provided an improved contrast ratio of 41 and the liquid crystal composition 2-AII provided a slightly improved contrast ratio of 31 when compared with the liquid crystal composition A (contrast ratio of 28).

On the other hand, the liquid crystal composition 2-AIII according to the present invention containing the mesomorphic compounds of the formulae (3) and (4) provided not only a homogeneous uniform alignment state but also a remarkably improved contrast ratio of 49 and wider drive margins although the temperature characteristic thereof ($f^{10/40}$=4.00) was somewhat inferior to that ($f^{10/40}$=3.68) of the liquid crystal composition A.

Accordingly, it has been confirmed that the liquid crystal composition (Composition 2-AIII) according to the present invention showed a balanced performance in view of improvements in uniform aligning characteristic, temperature characteristic, contrast ratio and drive margin as a whole.

EXAMPLE 3

Liquid crystal compositions 3-AI, 3-AII and 3-AIII (Compositions 3-AI, 3-AII and 3-AIII) were prepared in the same manner as in Example 1 except for using the following example compounds in the indicated proportions, respectively.

| Composition | Ex. Comp. No. | Structural formula | wt. parts |
|---|---|---|---|
| 3-AI | 3-25 | $C_{11}H_{23}$—(pyrimidine)—(phenyl)—(phenyl)—(indanyl)—$C_8H_{17}$ | 13.5 |
|  | 3-20 | $C_6H_{13}$—(pyrimidine)—(phenyl)—(phenyl)—(indanyl)—$C_6H_{13}$ | 13.5 |
|  |  | Composition A | 73 |
| 3-AII | 4-18 | $C_{10}H_{21}$—(pyrimidine)—(phenyl)—O—$(CH_2)_5$—(phenyl) | 8 |
|  | 4-16 | $C_{10}H_{21}$—(pyrimidine)—(phenyl)—(phenyl)—$(CH_2)_4$—(phenyl) | 8 |
|  | 4-85 | (phenyl)—$(CH_2)_4$—(pyrimidine)—(phenyl)—(cyclohexyl H)—$C_5H_{11}$ | 8 |
|  | 4-90 | (phenyl)—$(CH_2)_5$—O—(pyrimidine)—(phenyl)—$C_{10}H_{21}$ | 3 |
|  |  | Composition A | 73 |

| Compo-sition | Ex. Comp. No. | Structural formula | wt. parts |
|---|---|---|---|
| 3-AIII | 3-25 | 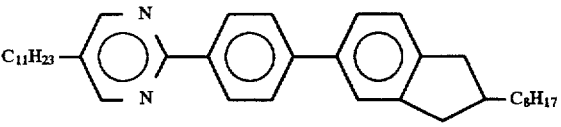 | 5 |
| | 3-20 | 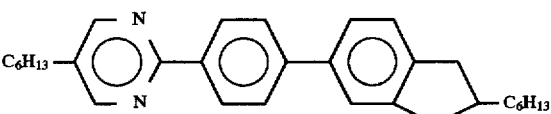 | 5 |
| | 4-18 | 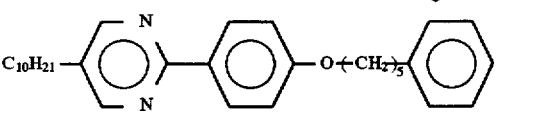 | 5 |
| | 4-16 | 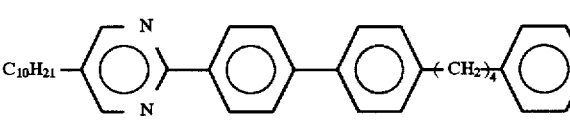 | 5 |
| | 4-85 | 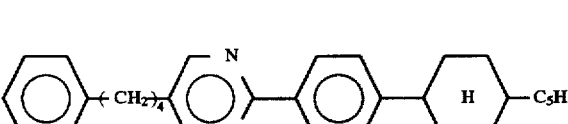 | 5 |
| | 4-90 | 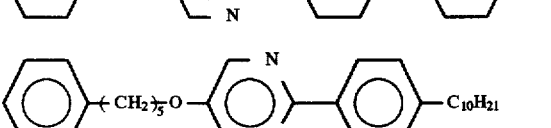 | 2 |
| | | Composition A | 73 |

The liquid crystal compositions 3-AI, 3-AII and 3-AIII showed the following phase transition series, spontaneous polarization Ps and cone angle Ⓗ, respectively.

<Composition 3-AI>

Phase transition temperature (°C.)

$$\text{Cryst.} \underset{-31}{\overset{-21}{\rightleftarrows}} \text{Sm*C} \underset{58}{\rightleftarrows} \text{SmA} \underset{76}{\rightleftarrows} \text{Ch.} \underset{90}{\rightleftarrows} \text{Iso.}$$

Ps (nC/cm²)=4.8 (at 30° C.)

Ⓗ (degrees)=17.8 (at 30° C.)

<Composition 3-AII>

Phase transition temperature (°C.)

$$\text{Cryst.} \underset{-16}{\overset{-15}{\rightleftarrows}} \text{Sm*C} \underset{50}{\rightleftarrows} \text{SmA} \underset{75}{\rightleftarrows} \text{Ch.} \underset{80}{\rightleftarrows} \text{Iso.}$$

Ps (nC/cm²)=5.2 (at 30° C.)

Ⓗ (degrees)=15.1 (at 30° C.)

<Composition 3-AIII>

Phase transition temperature (°C.)

$$\text{Cryst.} \underset{-27}{\overset{-24}{\rightleftarrows}} \text{Sm*C} \underset{58}{\rightleftarrows} \text{SmA} \underset{81}{\rightleftarrows} \text{Ch.} \underset{92}{\rightleftarrows} \text{Iso.}$$

Ps (nC/cm²)=4.8 (at 30° C.)

Ⓗ (degrees)=15.1 (at 30° C.)

Liquid crystal devices (Devices 3-AI, 3-AII and 3-AIII) were prepared and evaluated in the same manner as (1) of Example 1 described above except that Compositions 3-AI, 3-AII and 3-AIII were used, respectively. The results are shown below.

<Device 3-AI>

Uniform aligning characteristic

Homogeneous uniform alignment was observed over the entire area of the liquid crystal device.

| | 10° C. | 20° C. | 30° C. | 40° C. | 50° C. |
|---|---|---|---|---|---|
| Drive margin (V) | 4.4 | 6.2 | 6.8 | 7.5 | 2.1 |
| Set Δt (μsec) | 440 | 240 | 133 | 84 | 48 |
| Contrast ratio: | 39 (at 30° C. | | | | |

<Device 3-AII>>
Uniform aligning characteristic
 Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 3.9 | 5.0 | 6.2 | 4.1 | — |
| Set Δt (μsec) | 421 | 231 | 129 | 82 | — |
| Contrast ratio: | 43 (at 30° C. | | | | |

(Note)
—: Not measurable.

<Device 3-AIII>
Uniform aligning characteristic
 Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 5.1 | 7.0 | 8.0 | 7.9 | 2.4 |
| Set Δt (μsec) | 370 | 203 | 123 | 80 | 42 |
| Contrast ratio: | 54 (at 30° C.) | | | | |

As apparent from Example 3, as to the phase transition temperature, the liquid crystal composition 3-AII showed a phase transition temperature (Tc) from SmA to Sm*C of 50° C. lower than those (58° C. for Composition 3-AI and 3-AIII, respectively) of the liquid crystal compositions 3-AI and 3-AIII. As a result, the liquid crystal device 3-AII using the liquid crystal composition 3-AII failed to provide a drive margin (V) and set Δt (μsec) at 50° C.

Further, the liquid crystal compositions 3-AI and 3-AII provided an improved uniform aligning characteristic but showed considerably inferior temperature characteristic ($f^{10/}_{40}$=5.24 for Composition 3-AI and 5.13 for Composition 3-AII) when compared with the (base) liquid crystal composition A ($f^{10/40}$=3.68). Regarding the contrast ratio C at 30° C.), the liquid crystal compositions 3-AI and 3-AII provided an improved contrast ratios of 39 and 43, respectively, when compared with the liquid crystal composition A (contrast ratio of 28).

On the other hand, the liquid crystal composition 3-AIII according to the present invention containing the mesomorphic compounds of the formulae (3) and (4) provided not only a homogeneous uniform alignment state but also a remarkably improved contrast ratio of 54 and wider drive margins although the temperature characteristic thereof ($f^{10/}_{40}$=4.63) was inferior to that ($f^{10/40}$=3.68) of the liquid crystal composition A.

Accordingly, it has been confirmed that the liquid crystal composition (Composition 3-AIII) according to the present invention showed a balanced performance when improvements in uniform aligning characteristic, temperature characteristic, contrast ratio and drive margin were taken into account as a whole.

EXAMPLE 4

A (base) liquid crystal composition B (Composition B) as prepared by mixing the following compounds in the indicated properties.

| Structural Formula | wt. parts |
|---|---|
| $C_5H_{11}$—⬡—(N=N, S)—⬡—$C_5H_{11}$ | 6.3 |
| $C_6H_{13}$—⬡—(N=N, S)—⬡—$C_4H_9$ | 6.2 |
| $C_{11}H_{23}$—(N,N)⬡—⬡—OC(=O)—(S)—$C_4H_9$ | 8.3 |
| $C_{11}H_{23}$—(N,N)⬡—⬡(F)—OC(=O)—(S)—$C_4H_9$ | 4.2 |
| $C_6H_{13}$—(N,S benzothiazole)—⬡—$OC_8H_{17}$ | 25.0 |
| $C_6H_{13}$—(N,N)⬡—⬡—$OC_{12}H_{25}$ | 5.0 |

-continued

| Structural Formula | wt. parts |
|---|---|
| $C_8H_{17}$—pyrazine—phenyl—$OC_9H_{19}$ | 10.0 |
| $C_8H_{17}$—pyrazine—phenyl—$OC_{10}H_{21}$ | 10.0 |
| $C_9H_{19}$—pyrazine—phenyl—$OC_8H_{17}$ | 5.0 |
| $C_{10}H_{21}$—pyrazine—phenyl—$OCH_2\overset{*}{C}HC_5H_{13}$ (F) | 12.5 |
| $C_{10}H_{21}O$—phenyl—CO—O—phenyl—$OCH_2\overset{CH_3}{C}HC_2H_5$ | 7.5 |

The liquid crystal composition B showed the following phase transition series, spontaneous polarization Ps and cone angle Ⓗ.

Phase transition temperature (°C.)

$$\text{Cryst.} \underset{-27}{\overset{-13}{\rightleftarrows}} \text{Sm*C} \underset{66}{\rightleftarrows} \text{SmA} \underset{75}{\rightleftarrows} \text{Ch.} \underset{84}{\rightleftarrows} \text{Iso.}$$

Ps (nC/cm$^2$)=12.6 (at 30° C.)

Ⓗ (degrees)=21.2 (at 30° C.)

A liquid crystal device (Device B) was prepared and evaluated in the same manner as in Example 1 described above except that Composition B was used. The results are shown below.

<Device B>
Uniform aligning characteristic

The liquid crystal device showed an alignment including 70% of uniform alignment and 30% of twist alignment. As a result, homogeneous uniform alignment was not observed over the entire area of the liquid crystal device. The liquid crystal device (or composition) also provided a layer inclination angle δ of 14.1 degrees and an apparent tilt angle θa of 13.7 degrees.

|  | 10° C. | 20° C. | 30° C. | 40° C. | 50° C. |
|---|---|---|---|---|---|
| Drive margin (V) | 2.2 | 3.0 | 4.4 | 4.1 | 2.2 |
| Set Δt (μsec) | 221 | 130 | 93 | 65 | 48 |
| Contrast ratio: | 19 (at 30° C.) | | | | |

Liquid crystal compositions 4-BI, 4-BII and 4-BIII (Compositions 4-BI, 4-BII and 4-BIII) were prepared in the same manner as in Example 1 except for using the following example compounds in the indicated proportions, respectively.

| Composition | Ex. Comp. No. | Structural formula | wt. parts |
|---|---|---|---|
| 4-BI | 3-26 | $C_{12}H_{25}$—pyrazine—phenyl—indanyl—$C_8H_{17}$ | 15 |
| | | Composition B | 85 |

| Composition | Ex. Comp. No. | Structural formula | wt. parts |
|---|---|---|---|
| 4-BII | 4-6 | $C_{10}H_{21}$—[pyridine(N,N)]—[phenyl]—$(CH_2)_4$—[cyclohexyl] | 15 |
| | | Composition B | 85 |
| 4-BIII | 3-26 | $C_{12}H_{25}$—[pyridine(N,N)]—[phenyl]—[decalin]—$C_8H_{17}$ | 10 |
| | 4-6 | $C_{10}H_{21}$—[pyridine(N,N)]—[phenyl]—$(CH_2)_4$—[cyclohexyl] | 5 |
| | | Composition B | 85 |

The liquid crystal compositions 4-BI, 4-BII and 4-BIII showed the following phase transition series, spontaneous polarization Ps and cone angle (H), respectively.

<Composition 4-BI>
Phase transition temperature (°C.)

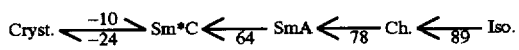

Ps (nC/cm$^2$)=8.5 (at 30° C.)

(H) (degrees)=20.0 (at 30° C.)

<Composition 4-BII>
Phase transition temperature (°C.)

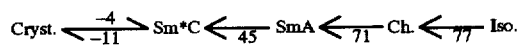

Ps (nC/cm$^2$)=8.0 (at 30° C.)

(H) (degrees)=12.2 (at 30° C.)

<Composition 4-BIII>
Phase transition temperature (°C.)

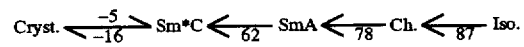

Ps (nC/cm$^2$)=8.3 (at 30° C.)

(H) (degrees)=16.7 (at 30° C.)

Liquid crystal devices (Devices 4-BI, 4-BII and 4-BIII) were prepared and evaluated in the same manner as in Example 1 described above except that Compositions 4-BI, 4-BII and 4-BIII were used, respectively. The results are shown below.

<Device 4-BI>
Uniform aligning characteristic

The liquid crystal device showed an alignment including 85% of uniform alignment and 15% of twist alignment. As a result, homogeneous uniform alignment was not observed over the entire area of the liquid crystal device. The liquid crystal device (or composition) also provided a layer inclination angle δ of 13.3 degrees and an apparent tilt angle θa of 14.0 degrees.

| | 10° C. | 20° C. | 30° C. | 40° C. | 50° C. |
|---|---|---|---|---|---|
| Drive margin (V) | 3.6 | 5.1 | 7.1 | 7.4 | 2.8 |
| Set Δt (μsec) | 218 | 129 | 92 | 63 | 42 |
| Contrast ratio: | 22 (at 30° C.) | | | | |

<Device 4-BII>
Uniform aligning characteristic

Homogeneous uniform alignment was observed over the entire area of the liquid crystal device. The liquid crystal device (or composition) also provided a layer inclination angle δ of 8.2 degrees and an apparent tilt angle θa of 8.4 degrees.

| | 10° C. | 20° C. | 30° C. | 40° C. | 50° C. |
|---|---|---|---|---|---|
| Drive margin (V) | 2.6 | 3.2 | 4.2 | — | — |
| Set Δt (μsec) | 141 | 89 | 62 | — | — |
| Contrast ratio: | 41 (at 30° C.) | | | | |

<Device 4-BIII>
Uniform aligning characteristic

Homogeneous uniform alignment was observed over the entire area of the liquid crystal device. The liquid crystal device (or composition) also provided a layer inclination angle δ of 10.9 degrees and an apparent tilt angle θa of 11.9 degrees.

| | 10° C. | 20° C. | 30° C. | 40° C. | 50° C. |
|---|---|---|---|---|---|
| Drive margin (V) | 4.0 | 5.8 | 7.1 | 7.5 | 2.6 |
| Set Δt (μsec) | 214 | 124 | 87 | 65 | 42 |
| Contrast ratio: | 38 (at 30° C.) | | | | |

As apparent from Example 4, the liquid crystal composition 4-BII using the mesomorphic compound of the formula (4) (but not using the mesomorphic compound of the formula (3)) showed a phase transition temperature Tc (SmA→Sm*C) of 45° C. lower than those (Tc=62–66° C.) of the liquid crystal compositions B, 4-BI and 4-BIII, thus failing to measure drive margins at 40° C. and 50° C. The liquid crystal composition 4-BI using the mesomorphic compound of the formula (3) (but not using the mesomorphic compound of the formula (4)) failed to provide a homogeneously uniform alignment state over the entire liquid crystal device since the alignment state of the liquid crystal device 4-BI including the liquid crystal composition 4-BI included 15% of a twist alignment state.

On the other hand, the liquid crystal composition 4-BIII according to the present invention containing the mesomorphic compounds of the formulae (3) and (4) in combination did not provide the above deficiencies of Compositions 4-BI and 4-BII (i.e., inferior uniform aligning characteristic and a lowering in Tc but provided excellent performances including better uniform aligning characteristic and a higher contrast ratio and wider drive meanings while retaining a Tc and $f^{10/40}$ substantially similar to those of the (base) liquid crystal composition B.

In other words, it has been confirmed that the liquid crystal composition (Composition 4-BIII) according to the present invention showed a balanced performance in view of improvements in uniform aligning characteristic, temperature characteristic ($f^{10/40}$), contrast ratio and drive margin as a whole.

EXAMPLE 5

Liquid crystal compositions 5-BI, 5-BII and 5-BIII (Compositions 5-BI, 5-BII and 5-BIII) were prepared in the same manner as in Example 1 except for using the following example compounds in the indicated proportions, respectively.

| Composition | Ex. Comp. No. | Structural formula | | wt. parts |
|---|---|---|---|---|
| 5-BI | 3-27 | $C_8H_{17}$— 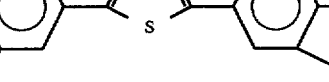 —$C_8H_{17}$ | | 25 |
| | | Composition B | | 75 |
| 5-BII | 4-10 | $C_{10}H_{21}$—  | | 13 |
| | 4-63 | $C_{10}H_{21}$—  | | 6 |
| | 4-16 | $C_{10}H_{21}$—  | | 6 |
| | | Composition B | | 75 |
| 5-BIII | 3-27 | $C_8H_{17}$—  —$C_8H_{17}$ | | 5 |
| | 4-10 | $C_{10}H_{21}$—O— 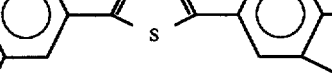 | | 10 |
| | 4-63 | $C_{10}H_{21}$—O— 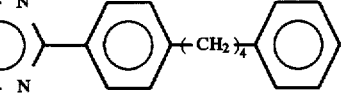 | | 5 |
| | 4-16 | $C_{10}H_{21}$— 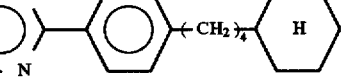 | | 5 |
| | | Composition B | | 75 |

The liquid crystal compositions 5-BI, 5-BII and 5-BIII showed the following phase transition series, spontaneous polarization Ps and cone angle (H), respectively.

<Composition 5-BI>
Phase transition temperature (°C.)

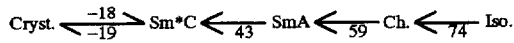

Ps (nC/cm$^2$)=6.2 (at 30° C.)

(H) (degrees)=9.2 (at 30° C.)

<Composition 5-BII>
Phase transition temperature

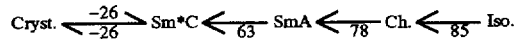

Ps (nC/cm$^2$)=7.0 (at 30° C.)

(H) (degrees)=17.9 (at 30° C.)

<Composition 5-BIII>
Phase transition temperature (°C.)

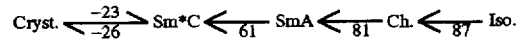

Ps (nC/cm$^2$)=6.6 (at 30° C.)

(H) (degrees)=15.6 (at 30° C.)

Liquid crystal device (Devices 5-BI, 5-BII and 5-BIII) were prepared and evaluated in the same manner as in Example 1 described above except that Compositions 5-BI, 5-BII and 5-BIII were used, respectively. The results are shown below.

<Device 5-BI>
Uniform aligning characteristic

Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 1.3 | 2.1 | 4.4 | — | — |
| Set Δt (μsec) | 121 | 80 | 54 | — | — |
| Contrast ratio: | | | 40 (at 30° C.) | | |

<Device 5-BII>
Uniform aligning characteristic

Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 4.8 | 6.2 | 6.7 | 8.0 | 3.0 |
| Set Δt (μsec) | 292 | 168 | 119 | 70 | 42 |
| Contrast ratio: | | | 31 (at 30° C.) | | |

<Device 5-BIII>
Uniform aligning characteristic

Homogeneous uniform alignment was observed over the entire area of the liquid crystal device.

|  | 10° C. | 20° C. | 30° C. | 40° C. | 50° C. |
|---|---|---|---|---|---|
| Drive margin (V) | 4.2 | 5.5 | 8.0 | 8.1 | 2.8 |
| Set Δt (μsec) | 260 | 145 | 100 | 67 | 42 |
| Contrast ratio: | | | 37 (at 30° C.) | | |

As apparent from Example 5, the liquid crystal composition 5-BI using the mesomorphic compound of the formula (3) (but not using the mesomorphic compound of the formula (4)) showed a phase transition temperature Tc (SmA→Sm*C) of 43° C. lower than those (Tc=61°–66° C.) of the liquid crystal compositions B, 5-BII and 5-BIII, thus failing the measure drive margins at 40° C. and 50° C. The liquid crystal composition 5-BI using the mesomorphic compound of the formula (3) (but not using the mesomorphic compound of the formula (4)) provided a homogeneously uniform alignment state over the entire liquid crystal device but showed an inferior temperature characteristics ($f^{10/40}$ (set Δt at 10° C./set Δt at 40° C.)=4.17 when compared with the (base) liquid crystal composition B ($f^{10/40}$=3.40). Regarding the contrast ratio (at 30° C.), the liquid crystal compositions 5-BI and 5-BII provided improved contrast ratios of 40 and 31, respectively, when compared with the liquid crystal composition B (contrast ratio of 19).

On the other hand, the liquid crystal composition 5-BIII according to the present invention containing the mesomorphic compounds of the formulae (3) and (4) in combination provided not only a homogeneous uniform alignment state but also an improved contrast ratio of 37 and wider drive margins although the temperature characteristic thereof ($f^{10/40}$=3.88) was somewhat inferior to that ($f^{10/40}$=3.40) of the liquid crystal composition B.

Accordingly, it has been confirmed that the liquid crystal composition (Composition 5-BIII) according to the present invention showed a balanced performance in view of improvements in uniform aligning characteristic, temperature characteristic ($f^{10/40}$), contrast ratio and drive margin as a whole.

EXAMPLE 6

Liquid crystal compositions 6-BI, 6-BII and 6-BIII (Compositions 6-BI, 6-BII and 6-BIII) were prepared in the same manner as in Example 1 except for using the following example compounds in the indicated proportions, respectively.

| Composition | Ex. Comp. No. | Structural formula | wt. parts |
|---|---|---|---|
| 6-BI | 3-30 | C₁₀H₂₁—[pyridine]—[phenyl]—[indane]—C₈H₁₇ | 20 |
| | | Composition B | 80 |
| 6-BII | 4-10 | C₁₀H₂₁—O—[pyrazine]—[phenyl]—(CH₂)₄—[phenyl] | 13 |
| | 4-85 | [phenyl]—(CH₂)₄—[pyrazine]—[phenyl]—[H cyclohexyl]—C₅H₁₁ | 7 |
| | | Composition B | 80 |
| 6-BIII | 3-30 | C₁₀H₂₁—[pyridine]—[phenyl]—[indane]—C₈H₁₇ | 5 |
| | 4-10 | C₁₀H₂₁—O—[pyrazine]—[phenyl]—(CH₂)₄—[phenyl] | 10 |
| | 4-85 | [phenyl]—(CH₂)₄—[pyrazine]—[phenyl]—[H cyclohexyl]—C₅H₁₁ | 5 |
| | | Composition B | 80 |

The liquid crystal compositions 6-BI, 6-BII and 6-BIII showed the following phase transition series, spontaneous polarization Ps cone angle (H), respectively.

<Composition 6-BI>

Phase transition temperature (°C.)

$$\text{Cryst.} \underset{-24}{\overset{-20}{\rightleftarrows}} \text{Sm*C} \underset{}{\overset{54}{\leftarrow}} \text{SmA} \underset{}{\overset{55}{\leftarrow}} \text{Ch.} \underset{}{\overset{68}{\leftarrow}} \text{Iso.}$$

Ps (nC/cm²)=6.7 (at 30° C.)

(H) (degrees)=6.7 (at 30° C.)

<Composition 6-BII>

Phase transition temperature (°C.)

$$\text{Cryst.} \underset{-36}{\overset{-20}{\rightleftarrows}} \text{Sm*C} \underset{}{\overset{61}{\leftarrow}} \text{SmA} \underset{}{\overset{80}{\leftarrow}} \text{Ch.} \underset{}{\overset{88}{\leftarrow}} \text{Iso.}$$

Ps (nC/cm²)=6.8 (at 30° C.)

(H) (degrees)=16.6 (at 30° C.)

<Composition 6-BIII>

Phase transition temperature (°C.)

$$\text{Cryst.} \underset{-34}{\overset{-22}{\rightleftarrows}} \text{Sm*C} \underset{}{\overset{56}{\leftarrow}} \text{SmA} \underset{}{\overset{78}{\leftarrow}} \text{Ch.} \underset{}{\overset{84}{\leftarrow}} \text{Iso.}$$

Ps (nC/cm²)=6.7 (at 30° C.)

(H) (degrees)=14.9 (at 30° C.)

Liquid crystal device (Devices 6-BI, 6-BII and 6-BIII) were prepared and evaluated in the same manner as in Example 1 described above except that Compositions 6-BI, 6-BII and 6-BIII were used, respectively. The results are shown below.

<Device 6-BI>

Uniform aligning characteristic

The alignment state was considerably inferior, thus being not measurable.

Drive margin (V): Not measurable.

Set Δt (μsec): Δt could not be set.

Contrast ratio: Not measurable.

<Device 6-BII>

Uniform aligning characteristic

Homogeneous uniform alignment was observed over the entire area of the liquid crystal device.

|         | 10° C.         | 20° C. | 30° C. | 40° C. | 50° C. |
|---------|----------------|--------|--------|--------|--------|
| Drive margin (V) | 2.9     | 6.0    | 7.2    | 6.1    | 2.4    |
| Set Δt (μsec)    | 240     | 121    | 82     | 53     | 26     |
| Contrast ratio:  | 32 (at 30° C.) | | | | |

<Device 6-BIII>
Uniform aligning characteristic
Homogeneous uniform alignment was observed over the entire area of the liquid crystal device.

|         | 10° C.         | 20° C. | 30° C. | 40° C. | 50° C. |
|---------|----------------|--------|--------|--------|--------|
| Drive margin (V) | 6.0     | 6.8    | 8.0    | 6.2    | 2.1    |
| Set Δt (μsec)    | 214     | 116    | 79     | 51     | 19     |
| Contrast ratio:  | 35 (at 30° C.) | | | | |

As apparent from Example 6, the liquid crystal composition 6-BI using the mesomorphic compound of the formula (3) (but not using the mesomorphic compound of the formula (4)) showed a narrow SmA temperature range of 54°–55° C. to provide an inferior alignment state thus failing to measure drive margins at 10° C. to 50° C. and a contrast ratio. The liquid crystal composition 6-BI using the mesomorphic compound of the formula (3) (but not using the mesomorphic compound of the formula (4)) provided a homogeneously uniform alignment state over the entire liquid crystal device but showed an inferior temperature characteristics ($f^{10/40}$ (set Δt at 10° C./set Δt at 40° C.)=4.53 when compared with the (base) liquid crystal composition B ($f^{10/40}$=3.40). Regarding the contrast ratio (at 30° C.), the liquid crystal composition 6-BII provided an improved contrast ratio of 32, when compared with the liquid crystal composition B (contrast ratio of 19).

On the other hand, the liquid crystal composition 6-BIII according to the present invention containing the mesomorphic compounds of the formulae (3) and (4) in combination provided not only a homogeneous uniform alignment state but also an improved contrast ratio of 35 and wider drive margins although the temperature characteristic thereof ($f^{10/40}$=4.20) was inferior to that ($f^{10/40}$=3.40) of the liquid crystal composition B.

Accordingly, it has been confirmed that the liquid crystal composition (Composition 6-BIII) according to the present invention showed a balanced performance when improvements in uniform aligning characteristic, temperature characteristic ($f^{10/40}$), contrast ratio and drive margin were taken into account as a whole.

EXAMPLE 7

Liquid crystal compositions 7-BI, 7-BII and 7-BIII (Compositions 7-BI, 7-BII and 7-BIII) were prepared in the same manner as in Example 1 except for using the following example compounds in the indicated proportions, respectively.

| Composition | Ex. Comp. No. | Structural formula | wt. parts |
|-------------|---------------|---------------------|-----------|
| 7-BI        | 3-34          | $C_{10}H_{21}$—⟨phenyl⟩—⟨phenyl⟩—⟨phenyl⟩—indanyl—$C_8H_{17}$ | 15 |
|             |               | Composition B | 85 |
| 7-BII       | 4-86          | ⟨phenyl⟩—(CH$_2$)$_4$—⟨pyrimidinyl⟩—⟨phenyl⟩—⟨phenyl⟩—$C_7H_{15}$ | 15 |
|             |               | Composition B | 85 |
| 7-BIII      | 3-34          | $C_{10}H_{21}$—⟨phenyl⟩—⟨phenyl⟩—⟨phenyl⟩—indanyl—$C_8H_{17}$ | 5 |
|             | 4-86          | ⟨phenyl⟩—(CH$_2$)$_4$—⟨pyrimidinyl⟩—⟨phenyl⟩—⟨phenyl⟩—$C_7H_{15}$ | 10 |
|             |               | Composition B | 85 |

The liquid crystal compositions 7-BI, 7-BII and 7-BIII showed the following phase transition series, spontaneous polarization Ps and cone angle (H), respectively.

<Composition 7-BI>
Phase transition temperature (°C.)

$$\text{Cryst.} \underset{-29}{\overset{-22}{\rightleftarrows}} \text{Sm*C} \underset{}{\overset{53}{\rightleftarrows}} \text{SmA} \underset{}{\overset{64}{\rightleftarrows}} \text{Ch.} \underset{}{\overset{82}{\rightleftarrows}} \text{Iso.}$$

Ps (nC/cm$^2$)=8.4 (at 30° C.)

(H) (degrees)=12.8 (at 30° C.)

<Composition 7-BII>
Phase transition temperature (°C.)

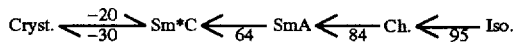

Ps (nC/cm²)=8.0 (at 30° C.)

Ⓗ (degrees)=18.2 (at 30° C.)

<Composition 7-BIII>
Phase transition temperature (°C.)

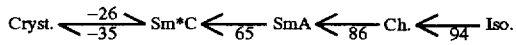

Ps (nC/cm²)=8.1 (at 30° C.)

Ⓗ (degrees)=16.7 (at 30° C.)

Liquid crystal device (Devices 7-BI, 7-BII and 7-BIII) were prepared and evaluated in the same manner as in Example 1 described above except that Compositions 7-BI, 7-BII and 7-BIII were used, respectively. The results are shown below.

<Device 7-BI>
Uniform aligning characteristic

Homogeneous uniform alignment was observed over the entire area of the liquid crystal device.

|                  | 10° C.        | 20° C. | 30° C. | 40° C. | 50° C. |
|------------------|---------------|--------|--------|--------|--------|
| Drive margin (V) | 2.1           | 3.2    | 5.1    | 4.1    | —      |
| Set Δt (μsec)    | 226           | 121    | 78     | 54     | —      |
| Contrast ratio:  | 33 (at 30° C.)|        |        |        |        |

<Device 7-BII>
Uniform aligning characteristic

Homogeneous uniform alignment was observed over the entire area of the liquid crystal device.

|                  | 10° C.        | 20° C. | 30° C. | 40° C. | 50° C. |
|------------------|---------------|--------|--------|--------|--------|
| Drive margin (V) | 3.1           | 5.2    | 7.0    | 6.8    | 3.1    |
| Set Δt (μsec)    | 321           | 168    | 104    | 75     | 51     |
| Contrast ratio:  | 29 (at 30° C.)|        |        |        |        |

<Device 7-BIII>
Uniform aligning characteristic

Homogeneous uniform alignment was observed over the entire area of the liquid crystal device.

|                  | 10° C.        | 20° C. | 30° C. | 40° C. | 50° C. |
|------------------|---------------|--------|--------|--------|--------|
| Drive margin (V) | 3.4           | 5.1    | 7.2    | 7.4    | 3.4    |
| Set Δt (μsec)    | 240           | 134    | 84     | 60     | 41     |
| Contrast ratio:  | 37 (at 30° C.)|        |        |        |        |

As apparent from Example 7, the liquid crystal compositions 7-BI and 7-BII provided an improved uniform aligning characteristic but showed inferior temperature characteristic ($f^{10/40}$ (set Δt at 10° C./set Δt at 40° C.)=4.19 for Composition 7-BI and 4.28 for Composition 7-BII) when compared with the (base) liquid crystal composition B ($f^{10/40}$=3.40). Regarding the contrast ratio (at 30° C.), the liquid crystal compositions 7-BI and 7-BII provided improved contrast ratios of 33 and 29, respectively, when compared with the liquid crystal composition B (contrast ratio of 19).

On the other hand, the liquid crystal composition 7-BIII according to the present invention containing the mesomorphic compounds of the formulae (3) and (4) in combination provided not only a homogeneous uniform alignment state but also a further improved contrast ratio of 37 and wider drive margins although the temperature characteristic thereof ($f^{10/40}$=4.00) was somewhat inferior to that ($f^{10/40}$=3.40) of the liquid crystal composition B.

Accordingly, it has been confirmed that the liquid crystal composition (Composition 7-BIII) according to the present invention showed a balanced performance as to improvements in uniform aligning characteristic, temperature characteristic, contrast ratio and drive margin as a whole.

As described hereinabove, according to the present invention, there is provided a chiral smectic liquid crystal composition characterized by a specific combination of a mesomorphic compound having an indan skeleton represented by the formula (1) (preferably the formula (3)) and a mesomorphic compound having a terminal cyclic group represented by the formula (2) (preferably the formula (4)).

When a liquid crystal device is prepared by using the above liquid crystal composition and satisfying the following alignment conditions (I) and (II):

$$Ⓗ < \alpha+\delta \text{ and } \delta < \alpha \qquad (I),$$

and $$Ⓗ > \theta_a > Ⓗ/2 \qquad (II),$$

the resultant liquid crystal device can provide a balanced performance with respect to a uniform aligning characteristic, a temperature-dependence of set Δt, a contrast ratio, and a drive margin in case where these characteristics are intended to be improved as a whole.

Further, the liquid crystal device is useful as a display device and also is useful in providing a good liquid crystal apparatus (including a liquid crystal display apparatus) in combination with a drive circuit, a light source, etc.

What is claimed is:

1. A liquid crystal composition, comprising:

a mesomorphic compound represented by the following formula (1):

$$R_1-A_1-X_1-A_2-X_2-A_3-R_2 \qquad (1),$$

wherein $R_1$ and $R_2$ independently denote hydrogen, halogen,

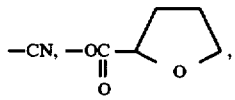

a cyclized alkyl group having 3–18 carbon atoms or a linear or branched alkyl group having 1–18 carbon atoms, said linear, branched or cyclized alkyl group capable of including at least one methylene group which can be replaced with —O—; —S—; —CO—; —CHW—, where W is halogen or $CF_3$; —CH=CH— or —C≡C— with the proviso that hetero atoms are not adjacent to each other;

$X_1$ and $X_2$ independently denote a single bond, —O—,

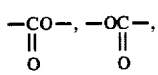

—CH$_2$—, OCH$_2$—, —CH=CH— or —C≡C—;

$A_1$, $A_2$ and $A_3$ independently denote a single bond,

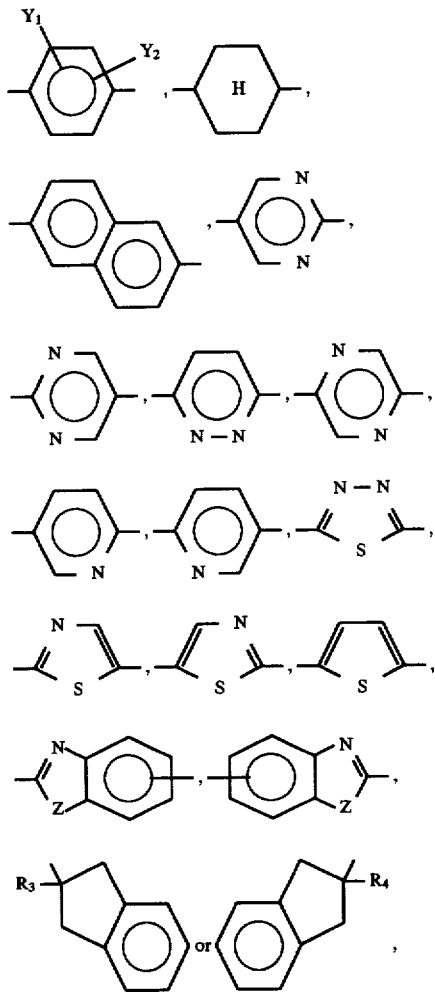

wherein $R_3$ and $R_4$ independently denote hydrogen, halogen,

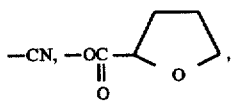

or a linear or branched alkyl group having 1–18 carbon atoms capable of including at least one methylene group which can be replaced with —O—; —S—; —CO—; —CHW— where W is halogen or CF$_3$; —CH=CH— or —C≡C— with the proviso that heteroatoms are not adjacent to each other; $Y_1$ and $Y_2$ independently denote H, F, Cl, Br, —CH$_3$ or —CN; Z denotes O or S; and at least one of $A_1$, $A_2$ and $A_3$ is

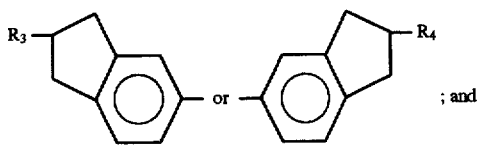

; and a mesomorphic compound represented by the following formula (2):

$$R_5—A_4—R_6 \qquad (2),$$

wherein $R_5$ and $R_6$ independently denote

or $R_7$, at least one of $R_5$ and $R_6$ being Q—X$_3$—(CH$_2$)$_L$X$_4$— wherein Q denotes

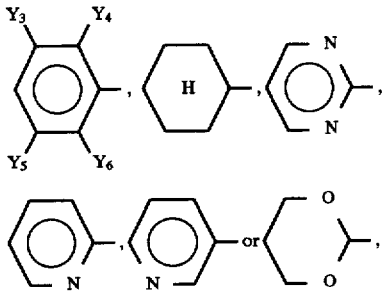

where $Y_3$, $Y_4$, $Y_5$ and $Y_6$ independently denote H, F, CH$_3$ or CF$_3$; $X_3$ denotes a single bond, —OCH$_2$—, —COO— or —OCO—; $X_3$ denotes a single bond, —CH$_2$O—, COO— or —OCO—; L is an integer of 3–16; and $R_7$ is

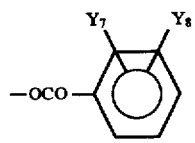

wherein $Y_7$ and $Y_8$ independently denote H, F, CH$_3$ or CF$_3$, a cyclized alkyl group having 3–18 carbon atoms or a linear or branched alkyl group having 1–18 carbon atoms, said linear, branched or cyclized alkyl group capable of including at least one methylene group which can be replaced with —O—, —S—, —CO—, —CH=CH—, —C≡C— or —CHW— where is halogen, CH or CF$_3$, provided that heteroatoms are not adjacent to each other; and $A_4$ denotes —A$_5$—X$_5$—A$_6$— or —A$_5$—A$_6$—X$_5$—A$_7$— wherein A$_5$, A$_6$, and A$_7$ independently denote

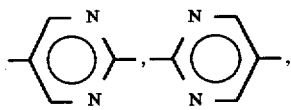

-continued

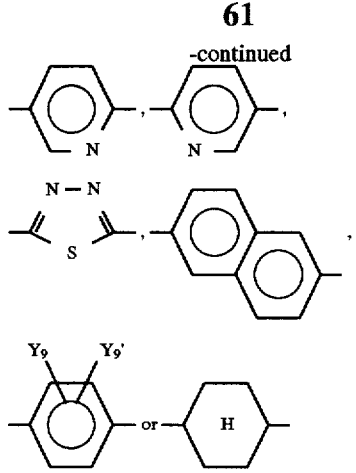

wherein $Y_9$ and $Y_9'$ independently denote H, F, $CH_3$ or $CF_3$, at least one of $A_5$, $A_6$ and $A_7$ being any one of

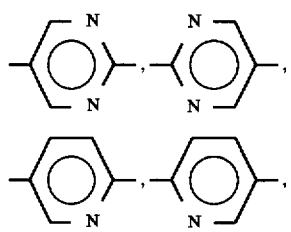

-continued

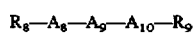

and $X_5$ denotes a single bond, $-C\equiv C-$, $-CH=CH-$, $-COO-$, $-COS-$ or $-CH_2O-$.

2. A composition according to claim 1, wherein said mesomorphic compound of the formula (1) is a mesomorphic compound represented by the following formula (3):

$$R_8-A_8-A_9-A_{10}-R_9 \qquad (3),$$

wherein $R_8$ and $R_9$ independently denote a cyclized alkyl group having 3–18 carbon atoms or a linear or branched alkyl group having 1–18 carbon atoms, said linear, branched or cyclized alkyl group capable of including at least one methylene group which can be replaced by $-O-$, $-S-$, $-CO-$, $-CH=CH-$, $-C\equiv C-$ or $-CHW-$ where W is halogen or $CF_3$ provided that heteroatoms are not adjacent to each other; and $A_8$, $A_9$ and $A_{10}$ independently denote a single bond,

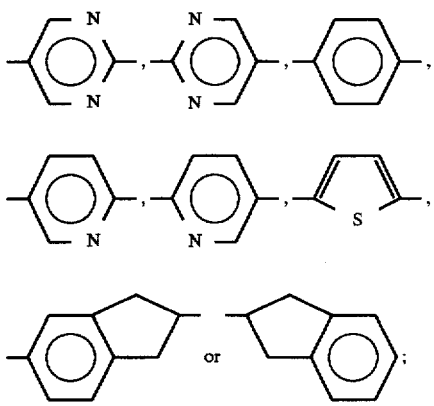

wherein at least one of $A_8$, $A_9$ and $A_{10}$ is

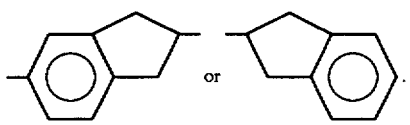

3. A composition according to claim 1, wherein said mesomorphic compound of the formula (2) is a mesomorphic compound represented by the following formula (4):

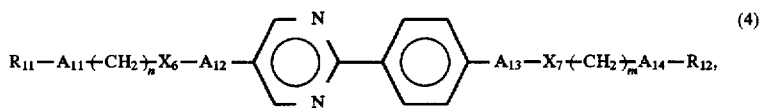

(4)

wherein $R_{11}$ and $R_{12}$ independently denote hydrogen, a cyclized alkyl group having 3–18 carbon atoms or a linear or branched alkyl group having 1–18 carbon atoms, said linear, branched or cyclized alkyl group capable of including at least one methylene group which can be replaced by $-O-$, $-S-$, $-CO-$, $-CH=CH-$, $-C\equiv C-$ or $-CHW-$ where W is halogen, CN or $CF_3$ provided that heteroatoms are not adjacent to each other, with the proviso that either one of $R_{11}$ and $R_{12}$ is hydrogen;

$A_{11}$, $A_{12}$, $A_{13}$ and $A_{14}$ independently denote a single bond,

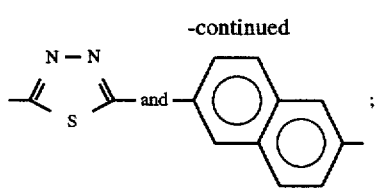

(with the provisos that: (i) either one of $A_{11}$ and $A_{14}$ is a single bond, (ii) both of $A_{11}$ and $A_{14}$ cannot be a single bond simultaneously, and (iii) at least one of $A_{12}$ and $A_{13}$ is a single bond);

n and m independently denote an integer of 0 or 3–16 (with the provisos that: (i) either one of n and m is 0, and (ii) both of n and m cannot be 0 at the same time); and $X_6$ and $X_7$ independently denote a single bond, $-O-$, $-COO-$ or $-OCO-$.

4. A composition according to claim 1, which further comprises 20–75 wt. % of a mesomorphic compound of the formula (5), 5–25 wt. % of a mesomorphic compound of the formula (6), 5–30 wt. % of a mesomorphic compound of the formula (7), and 0.1–30 wt. % of a mesomorphic compound of the formula (8), respectively shown below:

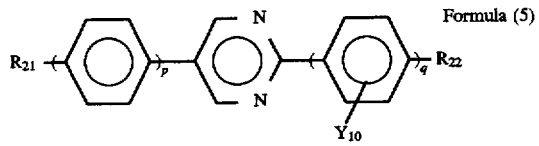
Formula (5)

wherein p and q independently denote 0, 1 or 2 satisfying p+q=1 or 2; $Y_{10}$ is hydrogen or fluorine; and $R_{21}$ and $R_{22}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other;

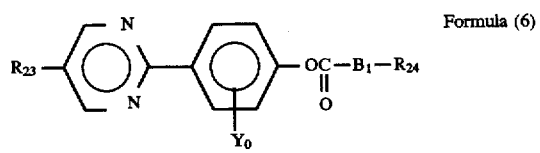
Formula (6)

wherein $B_1$ is

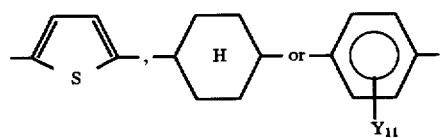

where $Y_{11}$ is hydrogen or fluorine; $Y_0$ is hydrogen or fluorine; $R_{23}$ is a linear or branched alkyl group having 1–18 carbon atoms; $R_{24}$ is hydrogen, halogen, CN, or a linear or branched alkyl group having 1–18 carbon atoms; and at least one methylene group in the alkyl group of $R_{23}$ or $R_{24}$ can be replaced by —O—, —S—, —CO—, —CH=CH—, —C≡C—, or —CHW— where W is halogen, CN or $CF_3$ provided that heteroatoms are not adjacent to each other;

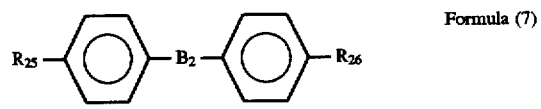
Formula (7)

wherein $B_2$ is

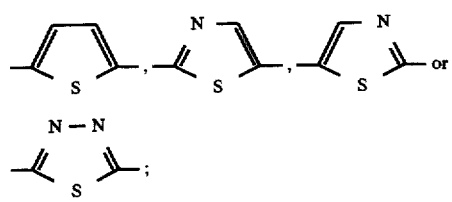

and $R_{25}$ and $R_{26}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other; and

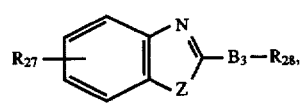
Formula (8)

wherein $B_3$ is

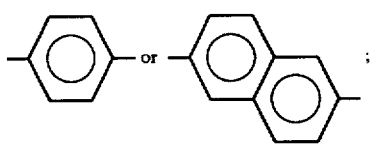

and $R_{27}$ and $R_{28}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other.

5. A composition according to claim 4, wherein:
said mesomorphic compound of the formula (5) includes at least one species of mesomorphic compound of the formulae (5-1) to (5-7); said mesomorphic compound of the formula (6) includes at least one species of mesomorphic compound of the formulae (6-1) to (6-5); said mesomorphic compound of the formula (7) includes at least one species of mesomorphic compound of the formulae (7-1) to (7-9); and said mesomorphic compound of the formula (8) includes at least one species of mesomorphic compound of the formulae (8-1) to (8-6), respectively shown below:

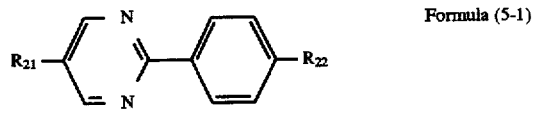
Formula (5-1)

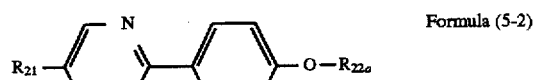
Formula (5-2)

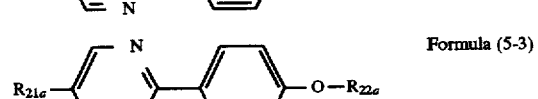
Formula (5-3)

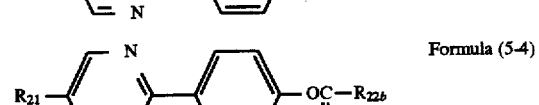
Formula (5-4)

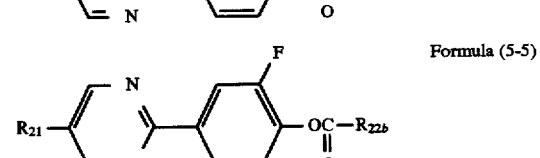
Formula (5-5)

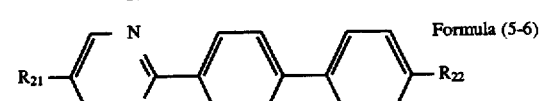
Formula (5-6)

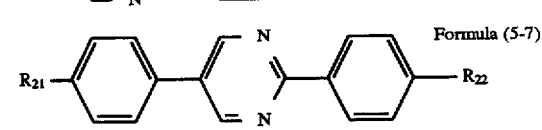
Formula (5-7)

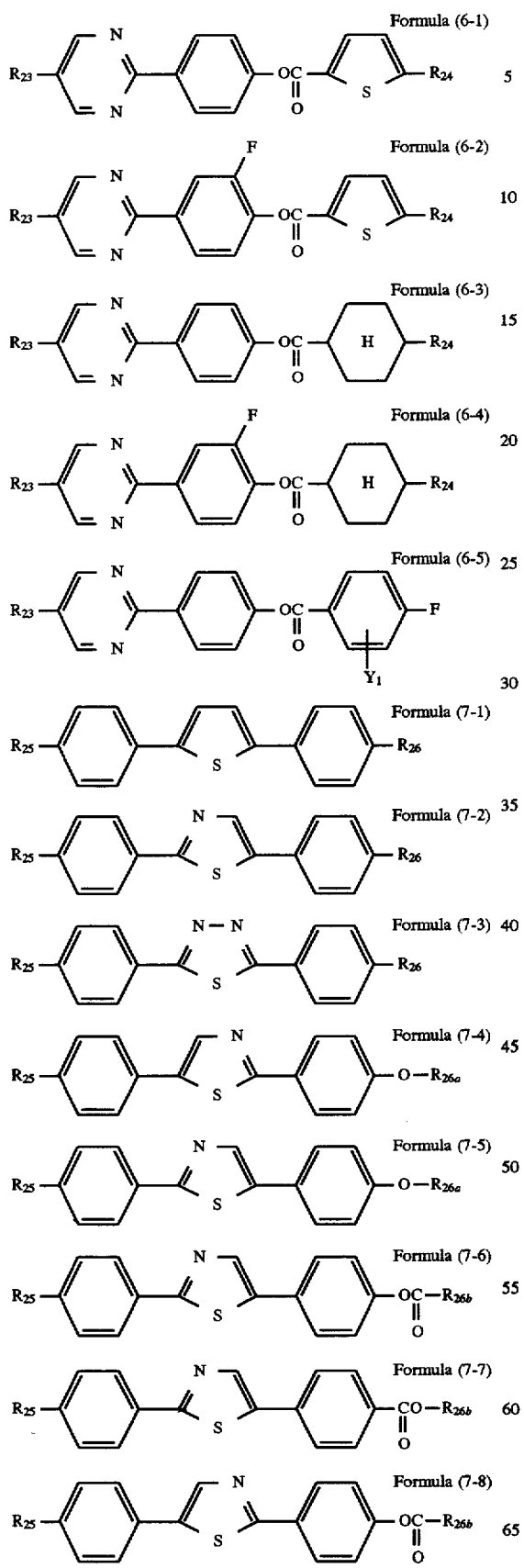
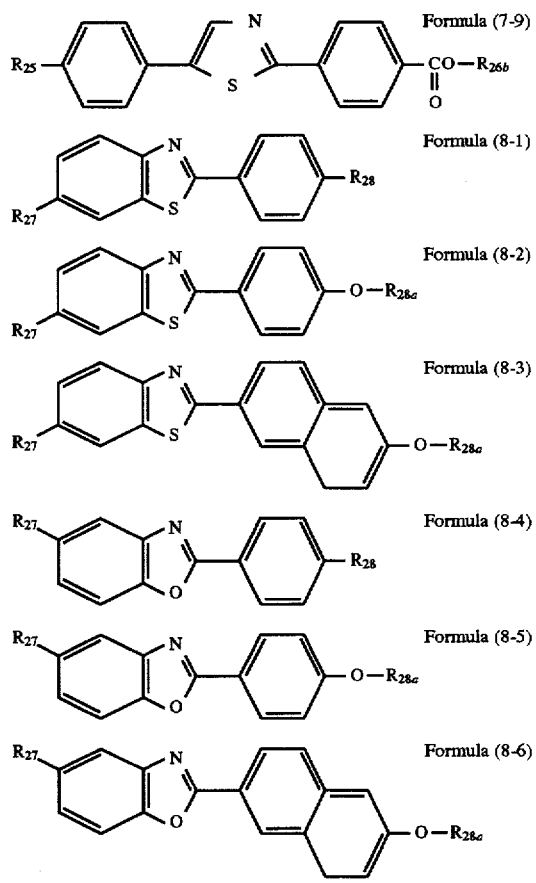

wherein $R_{21a}$, $R_{22a}$, $R_{26a}$ and $R_{28a}$ independently denote a linear or branched alkyl group having 1–17 carbon atoms; and $R_{22b}$ and $R_{26b}$ independently denote a linear or branched alkyl group having 1–16 carbon atoms.

6. A composition according to claim 1, which further comprises at least one species of an optically active compound.

7. A composition according to claim 1, which assumes at least a chiral smectic phase.

8. A composition according to claim 7, which shows ferroelectricity.

9. A composition according to claim 7, which has a phase transition series on temperature decrease including an isotropic phase, a cholesteric phase, a smectic phase and a chiral smectic phase.

10. A composition according to claim 7, wherein said chiral smectic phase is a chiral smectic C phase.

11. A composition according to any one of claims 1–6, which contains 1–40 wt. % of said mesomorphic compound of the formula (1) and 1–40 wt. % of said mesomorphic compound of the formula (2).

12. A composition according to any one of claims 1–6, which contains 1–30 wt. % of said mesomorphic compound of the formula (1) and 1–30 wt. % of said mesomorphic compound of the formula (2).

13. A composition according to any one of claims 1–6, which contains 1–20 wt. % of said mesomorphic compound of the formula (1) and 1–20 wt. % of said mesomorphic compound of the formula (2).

14. A composition according to claim 10, which shows a layer inclination angle δ in chiral smectic C phase of 3–15 degrees in a temperature range of 0°–60° C.

15. A liquid crystal device, comprising: a pair of oppositely disposed substrate and a liquid crystal disposed therebetween, each of opposite surfaces of the substrates being provided with an electrode for applying a voltage to said liquid crystal; wherein at least one of said opposite surfaces of the substrates is further provided with an alignment control layer for controlling an alignment state of said liquid crystal, and said liquid crystal is a liquid crystal composition according to any one of claim 1-10 and 14.

16. A device according to claim 15, wherein said device provides a pretilt angle a and said liquid crystal composition is a chiral smectic liquid crystal composition placed in such an alignment state that the chiral smectic liquid crystal shows a cone angle $Ⓗ$, a layer inclination angle $\delta$ in chiral smectic C phase, and an apparent tilt angle $\theta a$ satisfying the following relationships (I), (II) and (III) in combination with the pretilt angle $\alpha$:

$$Ⓗ < \alpha + \delta \quad \text{(I)},$$

$$\delta < \alpha \quad \text{(II)},$$

and $$Ⓗ > \theta a > Ⓗ/2 \quad \text{(III)}.$$

17. A device according to claim 15, wherein said alignment control layer is provided to both of the substrates and the alignment control layers are provided with respective uniaxial alignment axes extending in directions which are parallel to each other.

18. A device according to claim 15, wherein said alignment control layer is provided to both of the substrates and the alignment control layers are provided with respective uniaxial alignment axes extending in directions which intersect with each other at a prescribed crossing angle.

19. A device according to claim 18, wherein said crossing angle is at most 25 degrees.

20. A device according to claim 16, wherein said pretilt angle is at least 5 degrees.

21. A device according to claim 16, wherein said chiral smectic liquid crystal composition is disposed in a thickness structure formation of a helical structure of liquid crystal molecules between the substrates.

22. A liquid crystal apparatus, including: a liquid crystal device according to claim 15 and drive means for driving the liquid crystal device.

* * * * *

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

ON COVER PAGE

Insert --[30] Foreign Application Priority Data
   Nov. 10, 1994 [JP] Japan .......... 6-300212--.

ON COVER PAGE, AT [56] References Cited FOREIGN PATENT DOCUMENTS

```
"1140198                  --1-140198
 3035220                    3-035220
 3252624    should read     3-252624
 5262678                    5-262678
 6256231"                   6-256231--.
```

COLUMN 1

Line 24, "(SmH,)" should read --(SmH*)--;
Line 25, "SmH," should read --SmH*--.

COLUMN 3

Line 55, "linear" should read --linear,--;
Line 61, "bond," should read --bond, -O-, -.

COLUMN 4

Line 3, "single" should read --single bond,--;
Line 65, "and or S;" should be deleted.

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

COLUMN 5

Line 40, ", or" should read --or--.

COLUMN 6

Line 23, "$Y_9$ and $Y_9$," should read --$Y_9$ and $Y_9'$--.

COLUMN 7

Line 54, "may" should read --may be--;
Line 58, "each" should read --of each--.

COLUMN 8

Line 24, "bond" should read --bond,--.

COLUMN 10

Line 18, "oct=$C_8C_{17}$," should read --oct=$C_8H_{17}$,--;
Line 26, "(formula 3) should read --(formula (3))--.

COLUMN 11

Formula 3 compound, "md" (all occurrences) should read --ind--;
Formula 3 compound, at Ex. 3-19, "$CH_2=CH-(CH_2)-_9O$" should read --$CH_2=CH-(CH_2)_9-O$--

UNITED STATES PATENT AND TRADEMARK OFFICE
CERTIFICATE OF CORRECTION

PATENT NO. : 5,728,318
DATED : March 17, 1998
INVENTOR(S): MASATAKA YAMASHITA ET AL.

It is certified that error appears in the above-identified patent and that said Letters Patent is hereby corrected as shown below:

COLUMN 17

Formula 4 compound continued, at Ex. 4-113, "2—$CF_{3\text{-but}*}$" should read --2—$CF_3$—but*--.

COLUMN 19

Line 1, "wherein $B_1$ is" should be deleted;
Line 40, "and and" should read --and--;
Line 67, "an" should be deleted.

COLUMN 20

Line 7, "preferably" should read --preferably be--;
Line 25, Formula (5-3), "$R_{21}O$—" should read --$R_{21a}$—O--.

COLUMN 21

Line 45, Formula (7-6), "—$R_{28b}$" should read ---$R_{26b}$--;
Line 50, Formula (7-7), "—$R_{28b}$" should read ---$R_{26b}$--;
Line 55, Formula (7-8), "—$R_{28b}$" should read ---$R_{26b}$--;
Line 60, Formula (7-9), "—$R_{28b}$" should read ---$R_{26b}$--.

COLUMN 23

Line 8, "provides" should read --provide--;
Line 57, "a a" should read --a--.

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

COLUMN 24

Line 10, "have" should read --has--;
Line 48, "(H)δ>α in C2 alignment" should read
   --(H)-δ>α in C2 alignment--.

COLUMN 25

Line 27, "instances," should read --instance--;
Line 28, "be" should be deleted.

COLUMN 26

Line 13, " 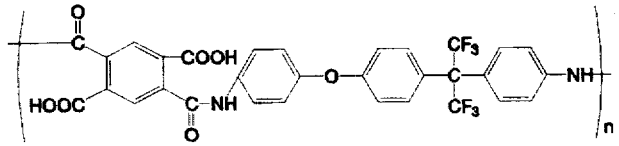 " should read

-- 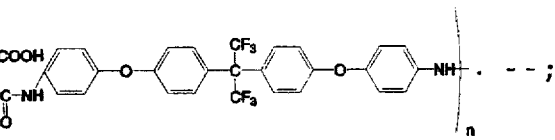 . --;

Line 52, "electrode" should read --electrodes--.

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

COLUMN 28

Line 9, "nonselected" should read --non-selected--.

COLUMN 29

Line 14, "an (H)" should read --angle (H)--;
Line 27, "polarizes" should read --polarizers--;
Line 41, "al" should read --al.--.

COLUMN 30

Line 32, "al" should read --al.--.

COLUMN 35

Line 1, "(H) degrees)" should read --(H) (degrees)--;
Line 41, "angle (H)" should read --angle (H).--;
Line 42, "temperature" should read --temperature (°C)--.

COLUMN 43

Line 1, "<Device 3-AII>>" should read --<Device 3-AII>--;
Line 9, "43 (at 30° C. should read --43 (at 30° C.)--.

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

COLUMN 44

Line 1, "($f^{10/}$" should be deleted;
Line 2, "40=5.24" should read --($f^{10/40}$=5.24--;
Line 4, "Cat 30°" should read --(at 30°--;
Line 16, "$f^{10/}$" should be deleted;
Line 17, "40-4.63)" should read --($f^{10/40}$=4.63)--.

COLUMN 45

Line 20, under col. "wt. parts" at "12.5", " $-OCH_2\overset{F}{\underset{*}{C}}HC_5H_{13}$ "

should read -- $-OCH_2\overset{F}{\underset{*}{C}}HC_6H_{13}$ --.

COLUMN 50

Composition 5-BII, at Ex. Comp. No. 4-10, "$C_{10}H_{21}-$" should read -- $C_{10}H_{21}-O-$ --;
Composition 5-BII, at Ex. Comp. No. 4-63, "$C_{10}H_{21}-$" should read -- $C_{10}H_{21}-O-$ --.

COLUMN 51

Line 15, "temperature" should read --temperature (°C)--;

Line 17, "Cryst. $\overset{-26}{\underset{-26}{\diagdown\diagup}}$" should read --Cryst. $\overset{-26}{\underset{-31}{\diagdown\diagup}}$ --;

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

COLUMN 51 (cont.)

Line 49 "Contrast ratio:       .40 (at 30° C)" should read --"Contrast ratio:  .40 (at 30° C)--;
Line 60 "Contrast ratio:       .31 (at 30° C)" should read --"Contrast ratio:  .31 (at 30° C)--;

COLUMN 52

Line 10, "Contrast ratio:       37 (at 30° C.)" should read --Contrast ratio:  37 (at 30° C.)--;
Line 41, "$f^{10/}$" should be deleted;
Line 42, "40=3.88) should read --($f^{10/40}$=3.88)--.

COLUMN 56

Line 4, "$f^{10/}$" should be deleted;
Line 5, "40=4.20)" should read --($f^{10/40}$=4.20)--.

COLUMN 58

Line 66, "hetero atoms" should read --heteroatoms--.

COLUMN 60

Line 55, "where" should read --where W--.

COLUMN 61

Line 19, "$Y_9$ and $Y_9$," should read --$Y_9$ and $Y_9'$--.

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

<u>COLUMN 62</u>

Line 31, "(4);" should read --(4):--.

<u>COLUMN 64</u>

Line 44, "$R_{21a}$—" should read --$R_{21a}$—O— --.

<u>COLUMN 66</u>

Line 15, "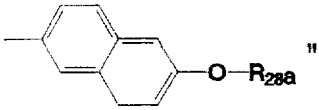" should read --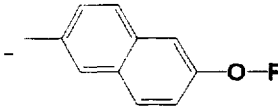--;

Line 30, "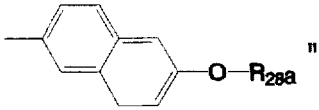" should read --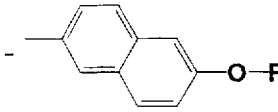--.

UNITED STATES PATENT AND TRADEMARK OFFICE
CERTIFICATE OF CORRECTION

PATENT NO. : 5,728,318

DATED : March 17, 1998

INVENTOR(S): MASATAKA YAMASHITA ET AL.

It is certified that error appears in the above-identified patent and that said Letters Patent is hereby corrected as shown below:

COLUMN 67

Line 9, "claim" should read --claims--.

COLUMN 68

Line 17, "structure" should read --suppressing--.

Signed and Sealed this

First Day of December, 1998

Attest:

BRUCE LEHMAN

Attesting Officer

Commissioner of Patents and Trademarks